(12) United States Patent
Li et al.

(10) Patent No.: US 10,827,194 B2
(45) Date of Patent: Nov. 3, 2020

(54) PICTURE PREDICTION METHOD AND RELATED APPARATUS

(71) Applicants: Huawei Technologies Co., Ltd., Shenzhen (CN); University of Science and Technology of China, Hefei (CN)

(72) Inventors: Li Li, Hefei (CN); Houqiang Li, Hefei (CN); Zhuoyi Lv, Shenzhen (CN); Sixin Lin, Shenzhen (CN)

(73) Assignees: Huawei Technologies Co., Ltd., Shenzhen (CN); University of Science and Technology of China, Hefei (CN)

( * ) Notice: Subject to any disclaimer, the term of this patent is extended or adjusted under 35 U.S.C. 154(b) by 153 days.

(21) Appl. No.: 15/461,274

(22) Filed: Mar. 16, 2017

(65) Prior Publication Data

US 2017/0188041 A1 Jun. 29, 2017

Related U.S. Application Data

(63) Continuation of application No. PCT/CN2015/076659, filed on Apr. 15, 2015.

(30) Foreign Application Priority Data

Sep. 30, 2014 (CN) .......................... 2014 1 0526608

(51) Int. Cl.
*H04N 19/513* (2014.01)
*H04N 19/176* (2014.01)
(Continued)

(52) U.S. Cl.
CPC ......... *H04N 19/513* (2014.11); *H04N 19/176* (2014.11); *H04N 19/182* (2014.11);
(Continued)

(58) Field of Classification Search
CPC .... H04N 19/176; H04N 19/182; H04N 19/51; H04N 19/54; H04N 19/593;
(Continued)

(56) References Cited

U.S. PATENT DOCUMENTS 5,652,616 A * 7/1997 Chen ....................... G06T 9/004
348/43
5,923,786 A * 7/1999 Murayama ................ G06T 9/20
375/240.14
(Continued)

FOREIGN PATENT DOCUMENTS

| CN | 1457196 A | 11/2003 |
|---|---|---|
| CN | 101198064 A | 6/2008 |

(Continued)

OTHER PUBLICATIONS

Han Huang; "Control-Point Representation and Differential Coding Affine-Motion Compensation", 2013 © IEEE, vol. 23 (Year: 2013).*
(Continued)

*Primary Examiner* — Dramos Kalapodas
(74) *Attorney, Agent, or Firm* — Leydig, Voit & Mayer, Ltd.

(57) ABSTRACT

A picture prediction method and a related apparatus are disclosed. The picture prediction method includes: determining motion vector predictors of K pixel samples in a current picture block, where K is an integer greater than 1, the K pixel samples include a first vertex angle pixel sample in the current picture block, a motion vector predictor of the first vertex angle pixel sample is obtained based on a motion vector of a preset first spatially adjacent picture block of the current picture block, and the first spatially adjacent picture block is spatially adjacent to the first vertex angle pixel sample; and performing, based on a non-translational motion model and the motion vector predictors of the K pixel samples, pixel value prediction on the current picture (Continued)

block. Solutions in the embodiments of the present application are helpful in reducing calculation complexity of picture prediction based on a non-translational motion model.

25 Claims, 8 Drawing Sheets

(51) Int. Cl.
   *H04N 19/54*    (2014.01)
   *H04N 19/182*   (2014.01)
   *H04N 19/51*    (2014.01)
   *H04N 19/593*   (2014.01)

(52) U.S. Cl.
   CPC ............ *H04N 19/51* (2014.11); *H04N 19/54* (2014.11); *H04N 19/593* (2014.11)

(58) Field of Classification Search
   CPC .... H04N 19/513; H04N 19/70; H04N 19/523; H04N 19/139; H04N 19/105; H04N 19/521; H04N 19/13; H04N 19/137
   See application file for complete search history.

(56) References Cited

U.S. PATENT DOCUMENTS

| | | | | |
|---|---|---|---|---|
| 8,229,222 B1* | 7/2012 | Silver | ................... | G06K 9/481 382/141 |
| 2003/0174776 A1 | 9/2003 | Shimizu et al. | | |
| 2010/0201870 A1 | 8/2010 | Luessi et al. | | |
| 2010/0215101 A1* | 8/2010 | Jeon | ................... | H04N 19/523 375/240.12 |
| 2013/0039423 A1* | 2/2013 | Helle | ................... | H04N 19/197 375/240.13 |
| 2013/0039426 A1* | 2/2013 | Helle | ................... | H04N 19/52 375/240.16 |
| 2013/0136185 A1* | 5/2013 | Tian | ................... | H04N 19/50 375/240.16 |
| 2013/0148734 A1 | 6/2013 | Nakamura | | |
| 2013/0287116 A1* | 10/2013 | Helle | ................... | H04N 19/176 375/240.24 |
| 2015/0092851 A1* | 4/2015 | Yoshikawa | ............ | H04N 19/44 375/240.13 |
| 2015/0195562 A1* | 7/2015 | Li | ......................... | H04N 19/56 375/240.02 |
| 2015/0208087 A1 | 7/2015 | Park et al. | | |
| 2017/0013277 A1* | 1/2017 | Pahalawatta | ....... | H04N 21/2365 |

FOREIGN PATENT DOCUMENTS

| | | | |
|---|---|---|---|
| CN | 101340583 A | * | 1/2009 |
| CN | 101340583 A | | 1/2009 |
| CN | 101350920 A | | 1/2009 |
| CN | 101771878 A | | 7/2010 |
| CN | 102939754 A | | 2/2013 |
| CN | 103155568 A | | 6/2013 |
| CN | 103475883 A | | 12/2013 |
| CN | 103905826 A | * | 7/2014 |
| CN | 103905826 A | | 7/2014 |
| JP | 2012010313 A | | 1/2012 |
| JP | 2012165278 A | | 8/2012 |
| KR | 20140022009 A | | 2/2014 |

OTHER PUBLICATIONS

Hoi-Kok Cheung et al., :"Local Affine Motion Prediction for H.264 Without Extra Overhead"; 2010(C)IEEE, 987-1-4244-5309-2 (Year: 2010).*

Han Huang et al., (hereinafter Huang) "Control-Point Representation and Differential Coding Affine-Motion Compensation", 2013 © IEEE, vol. 23 No. 10 2013.*

Huang et al., "Control-Point Representation and Differential Coding Affine-Motion Compensation," IEEE Transactions on Circuits and Systems for Video Technology, vol. 23, No. 10, pp. 1651-1660, Institute of Electrical and Electronics Engineers, New York, New York (Oct. 2013). (Year: 2013).*

Huang et al., "Control-Point Representation and Differential Coding Affine-Motion Compensation," IEEE Transactions on Circuits and Systems for Video Technology, vol. 23, No. 10, pp. 1651-1660, Institute of Electrical and Electronics Engineers, New York, New York (Oct. 2013).

CN 2017110220092, Search Report, dated Jul. 31, 2019.
JP/2019-114759, Office Action, dated Sep. 9, 2020.

* cited by examiner

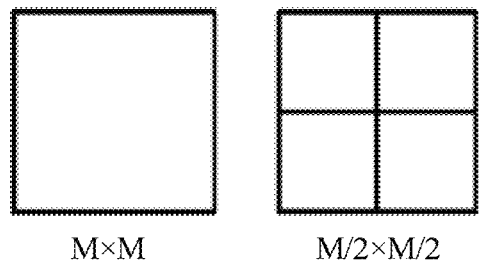

FIG. 1-a

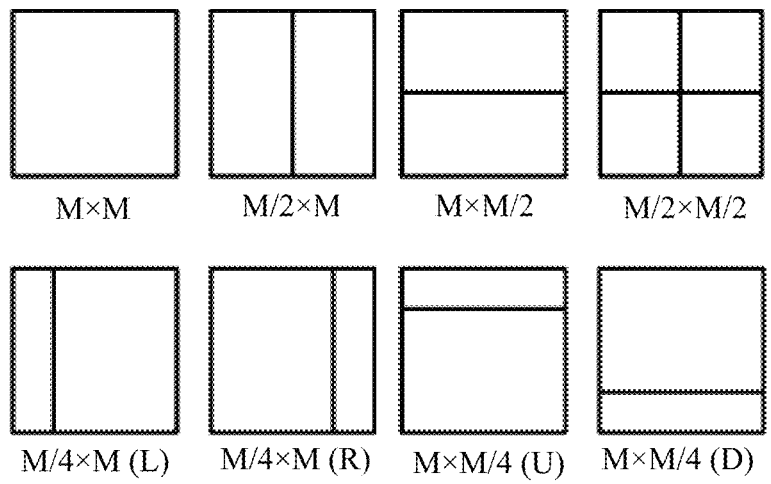

FIG. 1-b

| Determine motion vector predictors of K pixel samples in a current picture block, where K is an integer greater than 1, the K pixel samples include a first vertex angle pixel sample in the current picture block, a motion vector predictor of the first vertex angle pixel sample is obtained based on a motion vector of a preset first spatially adjacent picture block of the current picture block, and the first spatially adjacent picture block is spatially adjacent to the first vertex angle pixel sample | 101 |
|---|---|
| Perform, based on a non-translational motion model and the motion vector predictors of the K pixel samples, pixel value prediction on the current picture block | 102 |

FIG. 1-c

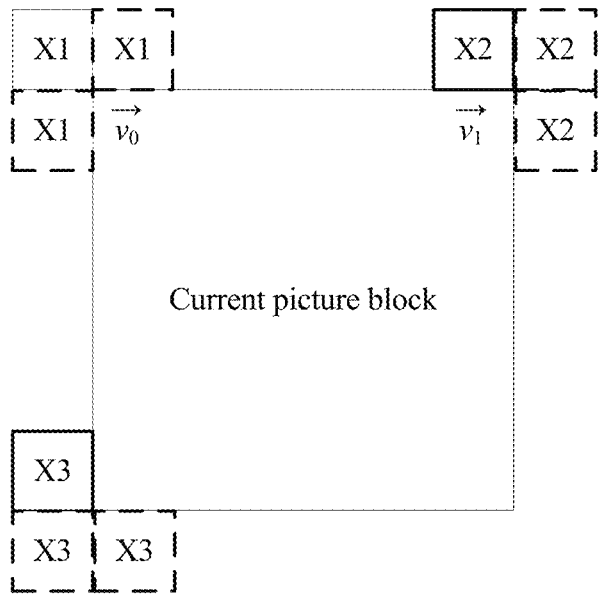
FIG. 2
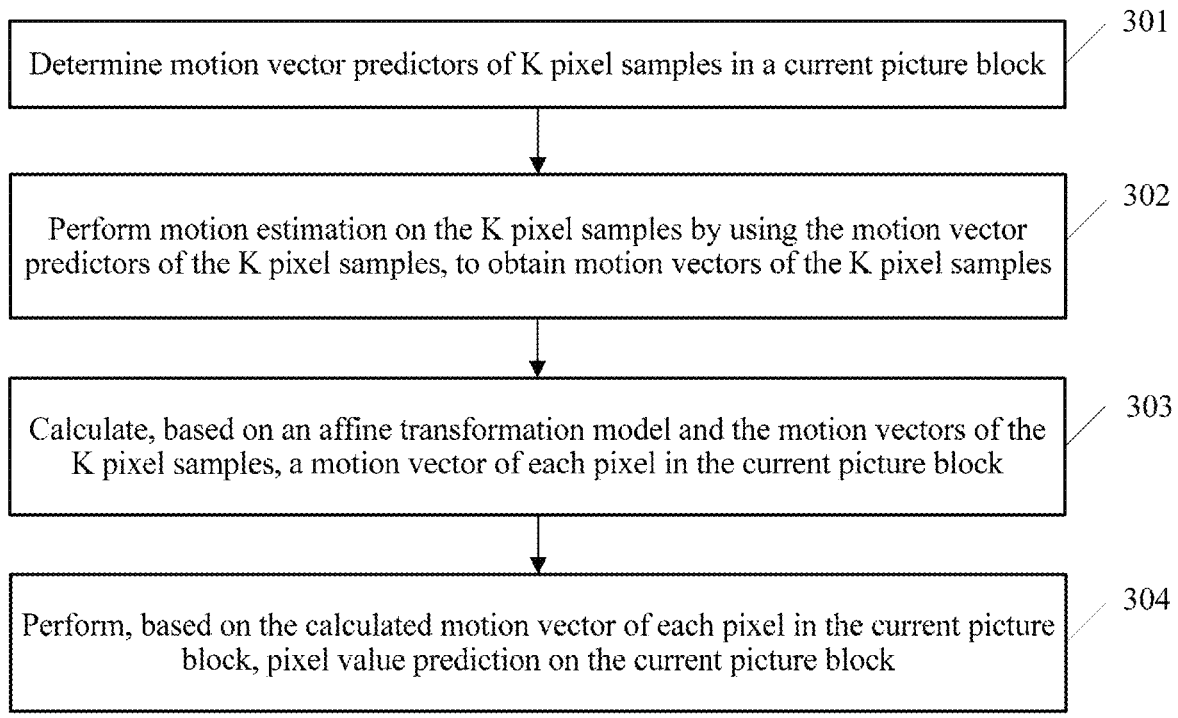
FIG. 3-a

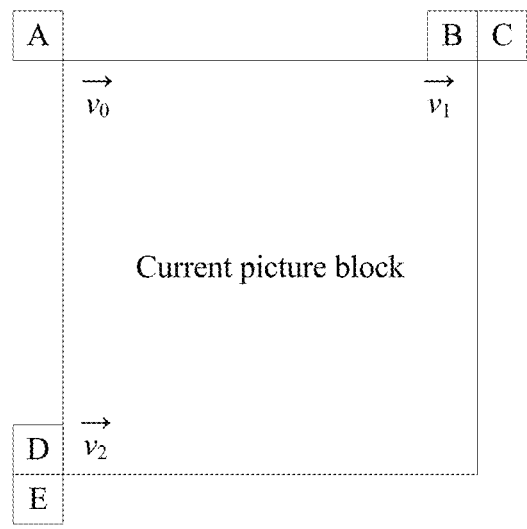
FIG. 3-b
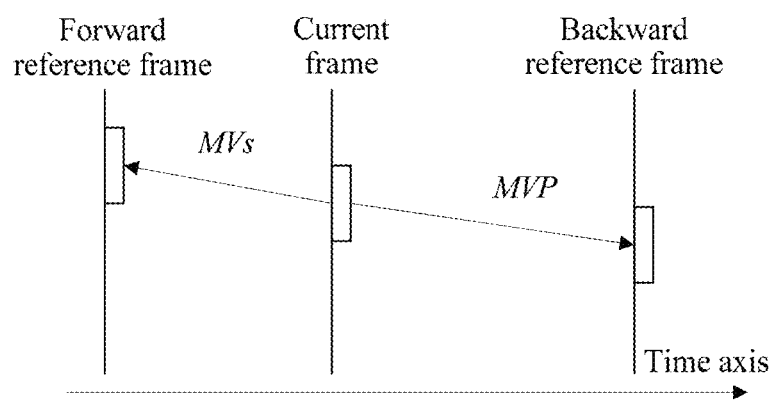
FIG. 3-c

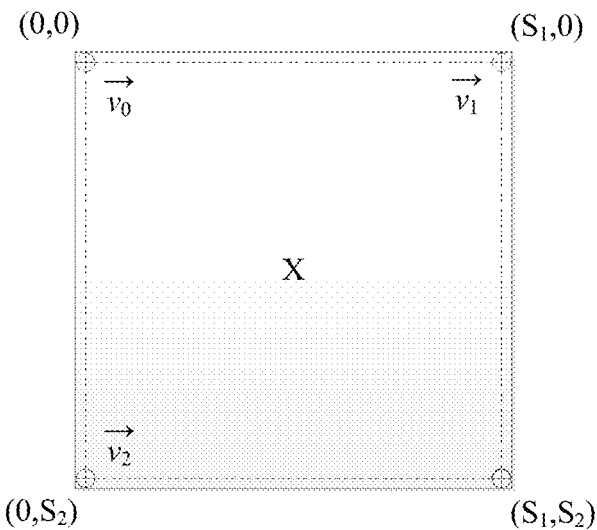
FIG. 3-d
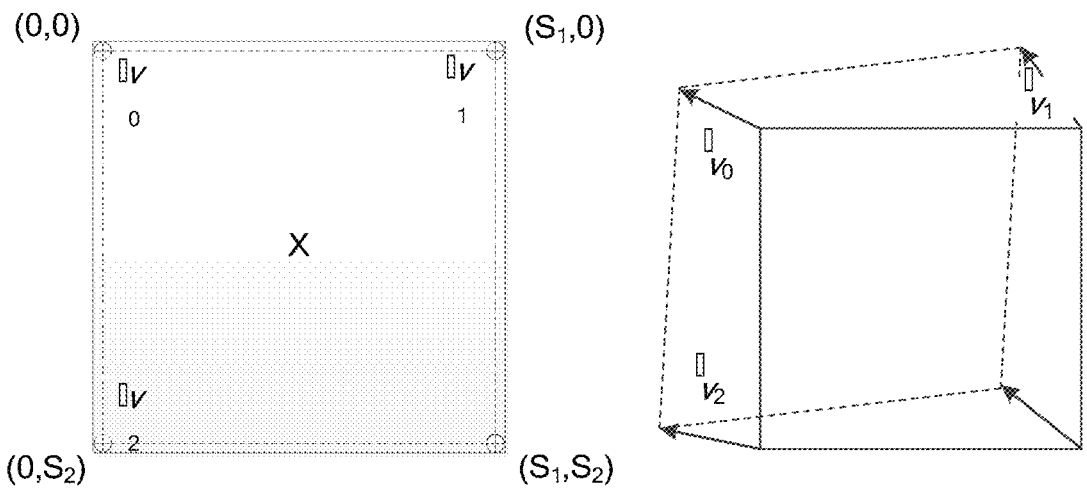
FIG. 3-e

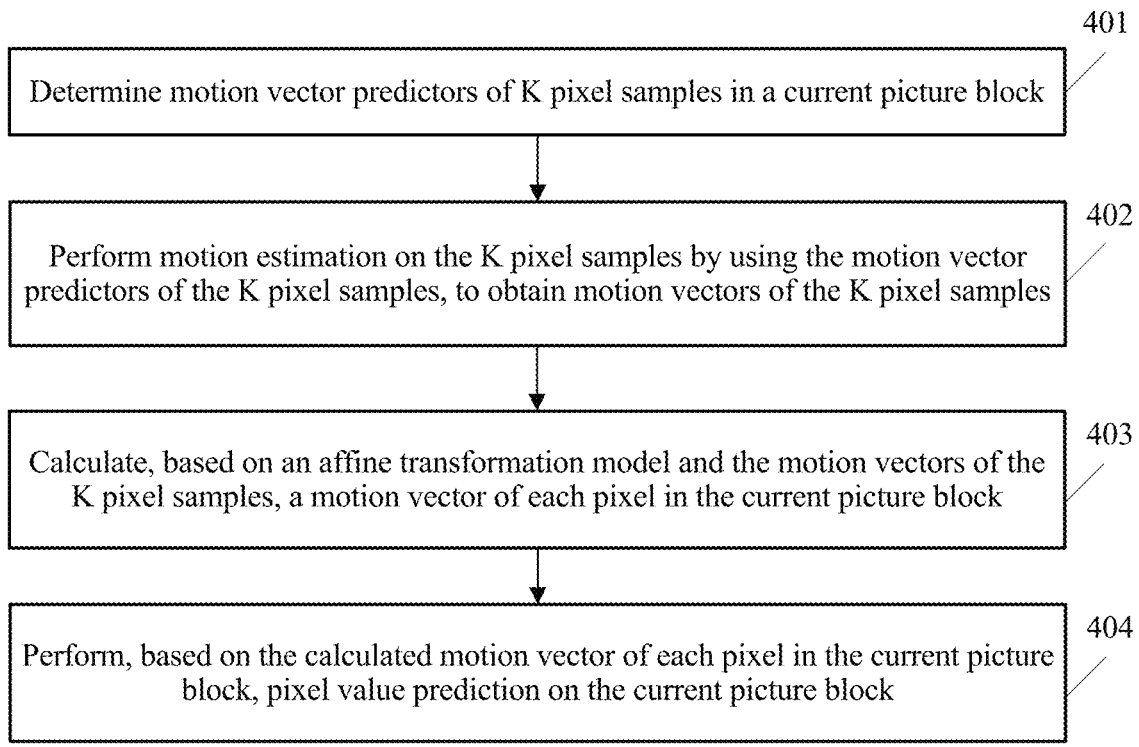
FIG. 4-a
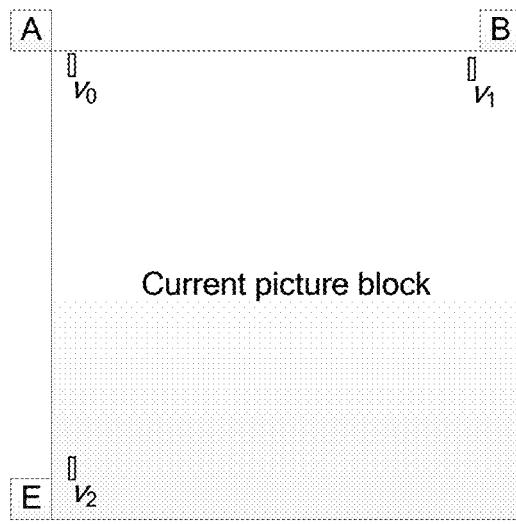
FIG. 4-b

PICTURE PREDICTION METHOD AND RELATED APPARATUS

STATEMENT OF JOINT RESEARCH AGREEMENT

The subject matter and the claimed application were made by or on the behalf of Huawei Technologies Co., Ltd., of Shenzhen, Guangdong Province, P.R. China and University of Science and Technology of China, of Baohe District, Hefei City, Anhui Province, China, under a joint research agreement titled "Research and Development of Next Generation Video Coding Standards and Technologies." The joint research agreement was in effect on or before the claimed application was made, and the claimed application was made as a result of activities undertaken within the scope of the joint research agreement.

CROSS-REFERENCE TO RELATED APPLICATIONS

This application is a continuation of International Application No. PCT/CN2015/076659, filed on Apr. 15, 2015. The International Application claims priority to Chinese Patent Application No. 201410526608.8, filed on Sep. 30, 2014. The disclosures of the aforementioned applications are hereby incorporated by reference in their entireties.

TECHNICAL FIELD

The present application relates to the field of picture processing technologies, and specifically, to a picture prediction method and a related apparatus.

BACKGROUND

With development of photoelectric acquisition technologies and continuous increase of requirements for high-definition digital videos, an amount of video data is increasingly large. Due to limited heterogeneous transmission bandwidths and diversified video applications, higher requirements are continuously imposed on video coding efficiency. A task of developing a High Efficiency Video Coding (HEVC) standard is initiated according to the requirements.

A basic principle of video compression coding is to use correlation between a space domain, a time domain, and a code word to remove redundancy as much as possible. Currently, a prevalent practice is to use a block-based hybrid video coding framework to implement video compression coding by performing steps of prediction (including intra-frame prediction and inter-frame prediction), transform, quantization, entropy coding, and the like. This coding framework shows a high viability, and therefore, HEVC still uses this block-based hybrid video coding framework.

In various video coding/decoding solutions, motion estimation or motion compensation is a key technology that affects coding/decoding efficiency. In various conventional video coding/decoding solutions, it is assumed that motion of an object always meets a translational motion, and that motion of every part of the entire object is the same. Basically, all conventional motion estimation or motion compensation algorithms are block motion compensation algorithms that are established based on a translational motion model. However, motion in the real world is diversified, and irregular motion such as scaling up/down, rotation, or parabolic motion is ubiquitous. Since the ninth decade of the last century, video coding experts have realized universality of irregular motion, and wished to introduce an irregular motion model (a non-translational motion model such as an affine motion model, a rotational motion model, or a scaling motion model) to improve video coding efficiency. However, computational complexity of conventional picture prediction performed based on a non-translational motion model is generally quite high.

SUMMARY

Embodiments of the present application provide a picture prediction method and a related apparatus, so as to reduce calculation complexity of picture prediction based on a non-translational motion model.

A first aspect of the present application provides a picture prediction method, including:

determining motion vector predictors of K pixel samples in a current picture block, where K is an integer greater than 1, the K pixel samples include a first vertex angle pixel sample in the current picture block, a motion vector predictor of the first vertex angle pixel sample is obtained based on a motion vector of a preset first spatially adjacent picture block of the current picture block, and the first spatially adjacent picture block is spatially adjacent to the first vertex angle pixel sample; and performing, based on a non-translational motion model and the motion vector predictors of the K pixel samples, pixel value prediction on the current picture block.

With reference to the first aspect, in a first possible implementation manner of the first aspect, the K pixel samples include at least two pixel samples in an upper left pixel sample, an upper right pixel sample, or a lower left pixel sample in the current picture block; and the upper left pixel sample in the current picture block is an upper left vertex of the current picture block or a pixel block that is in the current picture block and that includes an upper left vertex of the current picture block, the lower left pixel sample in the current picture block is a lower left vertex of the current picture block or a pixel block that is in the current picture block and that includes a lower left vertex of the current picture block, and the upper right pixel sample in the current picture block is an upper right vertex of the current picture block or a pixel block that is in the current picture block and that includes an upper right vertex of the current picture block.

With reference to the first possible implementation manner of the first aspect, in a second possible implementation manner of the first aspect, the first spatially adjacent picture block is a picture block X1, a picture block X2, or a picture block X3;

a motion vector predictor of the upper left pixel sample in the current picture block is obtained based on a motion vector of the picture block X1, the picture block X1 is a spatially adjacent picture block of the current picture block, and the picture block X1 is spatially adjacent to the upper left pixel sample in the current picture block;

a motion vector predictor of the upper right pixel sample in the current picture block is obtained based on a motion vector of the picture block X2, the picture block X2 is a spatially adjacent picture block of the current picture block, and the picture block X2 is spatially adjacent to the upper right pixel sample in the current picture block; and a motion vector predictor of the lower left pixel sample in the current picture block is obtained based on a motion vector of the picture block X3, the picture block X3 is a spatially adjacent picture block of the current picture block, and the picture block X3 is spatially adjacent to the lower left pixel sample in the current picture block.

With reference to the second possible implementation manner of the first aspect, in a third possible implementation manner of the first aspect, the first vertex angle pixel sample is the upper left pixel sample in the current picture block, the first spatially adjacent picture block is the picture block X1, and the picture block X1 is a spatially adjacent picture block on the upper left of the current picture block.

With reference to the third possible implementation manner of the first aspect, in a fourth possible implementation manner of the first aspect, the picture block X2 is a spatially adjacent picture block above the current picture block; or an absolute value of a difference between a motion vector absolute value of the picture block X2 and a motion vector absolute value of the picture block X1 is greater than or equal to an absolute value of a difference between a motion vector absolute value of a picture block X5 and the motion vector absolute value of the picture block X1, and the picture block X5 is any one of remaining at least some spatially adjacent picture blocks, other than the picture block X2, that are of the current picture block and that are spatially adjacent to the upper right vertex.

With reference to the third possible implementation manner of the first aspect or the fourth possible implementation manner of the first aspect, in a fifth possible implementation manner of the first aspect, the picture block X3 is a spatially adjacent picture block on the left of the current picture block; or an absolute value of a difference between a motion vector absolute value of the picture block X3 and the motion vector absolute value of the picture block X1 is greater than or equal to an absolute value of a difference between a motion vector absolute value of a picture block X6 and the motion vector absolute value of the picture block X1, and the picture block X6 is any one of remaining at least some spatially adjacent picture blocks, other than the picture block X3, that are of the current picture block and that are spatially adjacent to the lower left vertex.

With reference to any one of the first aspect, or the first to the fifth possible implementation manners of the first aspect, in a sixth possible implementation manner of the first aspect, the performing, based on a non-translational motion model and the motion vector predictors of the K pixel samples, pixel value prediction on the current picture block includes:

when reference frames corresponding to motion vector predictors of K1 pixel samples in the K pixel samples are not a reference frame Y1, scaling the motion vector predictors of the K1 pixel samples to the reference frame Y1, performing motion estimation on the K pixel samples by using motion vector predictors of K2 pixel samples and motion vector predictors that are of the K1 pixel samples and that are scaled to the reference frame Y1, to obtain motion vectors of the K pixel samples, and performing pixel value prediction on the current picture block by using the non-translational motion model and the motion vectors of the K pixel samples, where the K2 pixel samples are remaining pixel samples other than the K1 pixel samples in the K pixel samples, and K1 and K2 are positive integers.

With reference to the sixth possible implementation manner of the first aspect, in a seventh possible implementation manner of the first aspect, a pixel sample i is any pixel sample except the first vertex angle pixel sample in the K pixel samples, and if a prediction direction corresponding to a motion vector predictor of the pixel sample i is different from a prediction direction corresponding to the motion vector predictor of the first vertex angle pixel sample, a reference frame index corresponding to the motion vector predictor of the pixel sample i is 0.

With reference to the seventh possible implementation manner of the first aspect, in an eighth possible implementation manner of the first aspect, the reference frame Y1 is a reference frame corresponding to the motion vector predictor of the first vertex angle pixel sample, and that the motion vector predictor of the pixel sample i is scaled to the reference frame Y1 includes: if reference frame indexes corresponding to the motion vector predictors of the first vertex angle pixel sample and the pixel sample i are different, the motion vector predictor of the pixel sample i is scaled to the reference frame Y1.

With reference to the sixth possible implementation manner of the first aspect or the seventh possible implementation manner of the first aspect or the eighth possible implementation manner of the first aspect, in a ninth possible implementation manner of the first aspect, the performing motion estimation on the K pixel samples by using motion vector predictors of K2 pixel samples and motion vector predictors that are of the K1 pixel samples and that are scaled to the reference frame Y1, to obtain motion vectors of the K pixel samples includes:

performing motion estimation on the K pixel samples based on an iterative search algorithm by using the motion vector predictors of the K2 pixel samples and the motion vector predictors that are of the K1 pixel samples and that are scaled to the reference frame Y1, to obtain the motion vectors of the K pixel samples.

With reference to any one of the first aspect, or the first to the ninth possible implementation manners of the first aspect, in a tenth possible implementation manner of the first aspect, the non-translational motion model is any one of the following models: an affine transformation model, a parabolic motion model, a rotary motion model, a perspective motion model, a shearing motion model, or a scalable motion model.

With reference to any one of the first aspect, or the first to the tenth possible implementation manners of the first aspect, in an eleventh possible implementation manner of the first aspect, the picture prediction method is applied to a video coding process or the picture prediction method is applied to a video decoding process.

A second aspect of the present application provides a picture prediction apparatus, including:

a determining unit, configured to determine motion vector predictors of K pixel samples in a current picture block, where K is an integer greater than 1, the K pixel samples include a first vertex angle pixel sample in the current picture block, a motion vector predictor of the first vertex angle pixel sample is obtained based on a motion vector of a preset first spatially adjacent picture block of the current picture block, and the first spatially adjacent picture block is spatially adjacent to the first vertex angle pixel sample; and a predicting unit, configured to perform, based on a non-translational motion model and the motion vector predictors of the K pixel samples, pixel value prediction on the current picture block.

With reference to the second aspect, in a first possible implementation manner of the second aspect, the K pixel samples include at least two pixel samples in an upper left pixel sample, an upper right pixel sample, or a lower left pixel sample in the current picture block; and the upper left pixel sample in the current picture block is an upper left vertex of the current picture block or a pixel block that is in the current picture block and that includes an upper left vertex of the current picture block, the lower left pixel sample in the current picture block is a lower left vertex of the current picture block or a pixel block that is in the current picture block and that includes a lower left vertex of the current picture block, and the upper right pixel sample in the current picture block is an upper right vertex of the current picture block or a pixel block that is in the current picture block and that includes an upper right vertex of the current picture block.

With reference to the first possible implementation manner of the second aspect, in a second possible implementation manner of the second aspect, the first spatially adjacent picture block is a picture block X1, a picture block X2, or a picture block X3;

a motion vector predictor of the upper left pixel sample in the current picture block is obtained based on a motion vector of the picture block X1, the picture block X1 is a spatially adjacent picture block of the current picture block, and the picture block X1 is spatially adjacent to the upper left pixel sample in the current picture block;

a motion vector predictor of the upper right pixel sample in the current picture block is obtained based on a motion vector of the picture block X2, the picture block X2 is a spatially adjacent picture block of the current picture block, and the picture block X2 is spatially adjacent to the upper right pixel sample in the current picture block; and a motion vector predictor of the lower left pixel sample in the current picture block is obtained based on a motion vector of the picture block X3, the picture block X3 is a spatially adjacent picture block of the current picture block, and the picture block X3 is spatially adjacent to the lower left pixel sample in the current picture block.

With reference to the second possible implementation manner of the second aspect, in a third possible implementation manner of the second aspect, the first vertex angle pixel sample is the upper left pixel sample in the current picture block, the first spatially adjacent picture block is the picture block X1, and the picture block X1 is a spatially adjacent picture block on the upper left of the current picture block.

With reference to the third possible implementation manner of the second aspect, in a fourth possible implementation manner of the second aspect, the picture block X2 is a spatially adjacent picture block above the current picture block; or an absolute value of a difference between a motion vector absolute value of the picture block X2 and a motion vector absolute value of the picture block X1 is greater than or equal to an absolute value of a difference between a motion vector absolute value of a picture block X5 and the motion vector absolute value of the picture block X1, and the picture block X5 is any one of remaining at least some spatially adjacent picture blocks, other than the picture block X2, that are of the current picture block and that are spatially adjacent to the upper right vertex.

With reference to the third possible implementation manner of the second aspect or the fourth possible implementation manner of the second aspect, in a fifth possible implementation manner of the second aspect, the picture block X3 is a spatially adjacent picture block on the left of the current picture block; or an absolute value of a difference between a motion vector absolute value of the picture block X3 and the motion vector absolute value of the picture block X1 is greater than or equal to an absolute value of a difference between a motion vector absolute value of a picture block X6 and the motion vector absolute value of the picture block X1, and the picture block X6 is any one of remaining at least some spatially adjacent picture blocks, other than the picture block X3, that are of the current picture block and that are spatially adjacent to the lower left vertex.

With reference to any one of the second aspect, or the first to the fifth possible implementation manners of the second aspect, in a sixth possible implementation manner of the second aspect, the predicting unit is specifically configured to: when reference frames corresponding to motion vector predictors of K1 pixel samples in the K pixel samples are not a reference frame Y1, scale the motion vector predictors of the K1 pixel samples to the reference frame Y1, perform motion estimation on the K pixel samples by using motion vector predictors of K2 pixel samples and motion vector predictors that are of the K1 pixel samples and that are scaled to the reference frame Y1, to obtain motion vectors of the K pixel samples, and perform pixel value prediction on the current picture block by using the non-translational motion model and the motion vectors of the K pixel samples, where the K2 pixel samples are remaining pixel samples other than the K1 pixel samples in the K pixel samples, and K1 and K2 are positive integers.

With reference to the sixth possible implementation manner of the second aspect, in a seventh possible implementation manner of the second aspect, a pixel sample i is any pixel sample except the first vertex angle pixel sample in the K pixel samples, and if a prediction direction corresponding to a motion vector predictor of the pixel sample i is different from a prediction direction corresponding to the motion vector predictor of the first vertex angle pixel sample, a reference frame index corresponding to the motion vector predictor of the pixel sample i is 0.

With reference to the seventh possible implementation manner of the second aspect, in an eighth possible implementation manner of the second aspect, the reference frame Y1 is a reference frame corresponding to the motion vector predictor of the first vertex angle pixel sample, and the predicting unit is specifically configured to: if reference frame indexes corresponding to the motion vector predictors of the first vertex angle pixel sample and the pixel sample i are different, scale the motion vector predictor of the pixel sample i to the reference frame Y1.

With reference to any one of the second aspect, or the first to the eighth possible implementation manners of the second aspect, in a ninth possible implementation manner of the second aspect, the non-translational motion model is any one of the following models: an affine transformation model, a parabolic motion model, a rotary motion model, a perspective motion model, a shearing motion model, or a scalable motion model.

With reference to any one of the second aspect, or the first to the ninth possible implementation manners of the second aspect, in a tenth possible implementation manner of the second aspect, the picture prediction apparatus is applied to a video coding apparatus or the picture prediction apparatus is applied to a video decoding apparatus.

It may be learned that in the solutions in the embodiments of the present application, determined motion vector predictors of K pixel samples are referenced during pixel value prediction performed, based on a non-translational motion model, on a current picture block. The K pixel samples include a first vertex angle pixel sample in the current picture block. The motion vector predictors of the K pixel samples are directly used for prediction, a motion vector predictor of the first vertex angle pixel sample in the K pixel samples is obtained based on a motion vector of a preset first spatially adjacent picture block of the current picture block, and there is a single optional case for the motion vector predictors of the K pixel samples. Therefore, a mechanism that is used in a conventional technology and in which motion vector predictors of K pixel samples are selected from multiple optional motion vector predictor sets of the K pixel samples by means of massive calculation is abandoned. This is helpful in avoiding transferring selection information of motion information predictors in a bitstream, is helpful in improving coding efficiency, and is also helpful in significantly reducing calculation complexity of picture prediction based on a non-translational motion model.

BRIEF DESCRIPTION OF DRAWINGS

FIG. 1-a is a schematic diagram of a prediction unit division manner corresponding to intra-frame prediction according to an embodiment of the present application;

FIG. 1-b is a schematic diagram of several prediction unit division manners corresponding to inter-frame prediction according to an embodiment of the present application;

FIG. 1-c is a schematic flowchart of a picture prediction method according to an embodiment of the present application;

FIG. 2 is a schematic diagram of possible adjacent reference blocks of a current picture block according to an embodiment of the present application;

FIG. 3-a is a schematic flowchart of another picture prediction method according to an embodiment of the present application;

FIG. 3-b is another schematic diagram of possible adjacent reference blocks of a current picture block according to an embodiment of the present application;

FIG. 3-c is a schematic diagram of a reference frame of a current picture block according to an embodiment of the present application;

FIG. 3-d is a schematic diagram of a current picture block according to an embodiment of the present application;

FIG. 3-e is a schematic diagram of affine transformation of a picture block according to an embodiment of the present application;

FIG. 4-a is a schematic flowchart of another picture prediction method according to an embodiment of the present application;

FIG. 4-b is another schematic diagram of adjacent reference blocks of a current picture block according to an embodiment of the present application;

DESCRIPTION OF EMBODIMENTS

Figure 5:
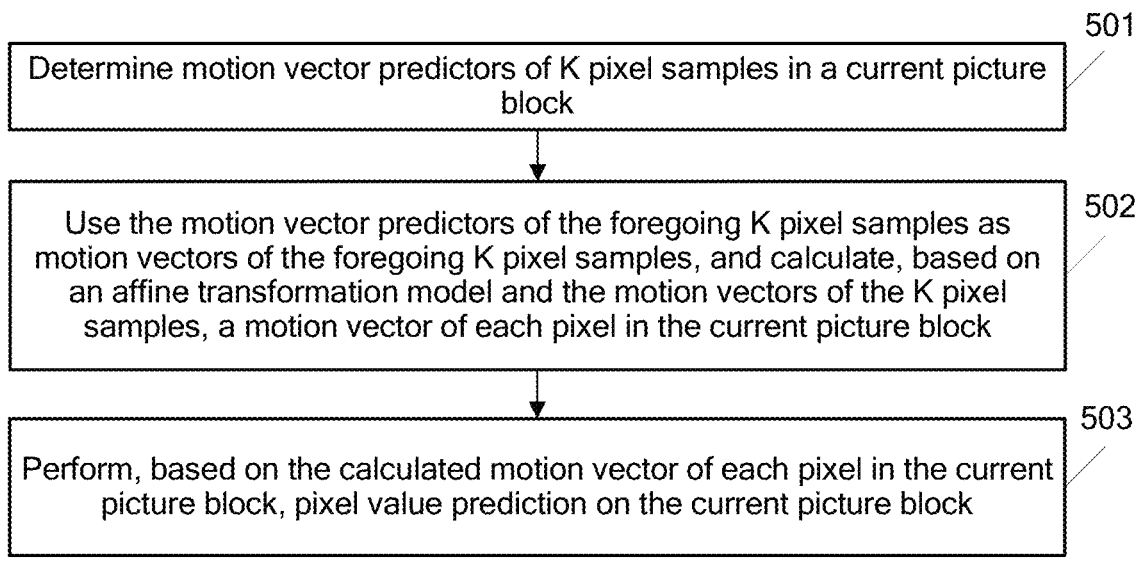
FIG. 5 is a schematic flowchart of another picture prediction method according to an embodiment of the present application.

The embodiments of the present application provide a picture prediction method and a related apparatus, so as to reduce calculation complexity of picture prediction based on a non-translational motion model.

To make persons skilled in the art better understand the technical solutions in the present application, the following clearly describes the technical solutions in the embodiments of the present application with reference to the accompanying drawings in the embodiments of the present application. The described embodiments are merely some rather than all of the embodiments of the present application. All other embodiments obtained by persons of ordinary skill in the art based on the embodiments of the present application without creative efforts shall fall within the protection scope of the present application.

The following provides detailed descriptions separately.

In the specification, claims, and accompanying drawings of the present application, terms "first", "second", "third", "fourth", and the like are intended to distinguish between different objects but do not indicate a particular order. In addition, terms "include", "have", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The following first describes some concepts that may be involved in the embodiments of the present application.

In most coding frameworks, a video sequence includes a series of pictures, the pictures are further divided into slices, and the slices are further divided into blocks. Video coding is to perform coding processing from left to right and from top to bottom row by row starting from an upper left corner position of a picture by using a block as a unit. In some new video coding standards, a concept of a block is further extended. There is a macroblock (MB) in the H.264 standard, and the macroblock may be further divided into multiple prediction blocks that may be used for predictive coding. In the HEVC standard, basic concepts such as a coding unit (CU), a prediction unit (PU), and a transform unit (TU) are used, and multiple units are classified according to functions, and a completely new tree-based structure is used for description. For example, the coding unit may be divided into smaller coding units according to a quadtree, and the smaller coding unit may be further divided, to form a quadtree structure. The prediction unit and the transform unit also have similar tree structures. Regardless of whether a unit is a coding unit, a prediction unit, or a transform unit, the unit belongs to the concept of a block in essence. The coding unit is similar to a macroblock MB or a coding block, and is a basic unit for partitioning and coding an picture. The prediction unit may correspond to a prediction block, and is a basic unit for predictive coding. The coding unit is further divided into multiple prediction units according to a division mode. The transform unit may correspond to a transform block, and is a basic unit for transforming a prediction residual.

In the HEVC standard, a size of the coding unit may include four levels: 64×64, 32×32, 16×16, and 8×8. Coding units at each level may be divided into prediction units of different sizes according to intra-frame prediction and inter-frame prediction. For example, as shown in FIG. 1-*a* and FIG. 1-*b*, FIG. 1-*a* shows an example of a prediction unit division manner corresponding to intra-frame prediction. FIG. 1-*b* shows examples of several prediction unit division manners corresponding to inter-frame prediction.

During development and evolution of video coding technologies, video coding experts figure out various methods to use temporal and spatial correlation between adjacent coding/decoding blocks to try to improve coding efficiency. In the H264/Advanced Video Coding (AVC) standard, a skip mode and a direct mode become effective tools for improving coding efficiency. Blocks of the two coding modes used when a bit rate is low can occupy more than a half of an entire coding sequence. When the skip mode is used, a motion vector of a current picture block can be derived by using nearby motion vectors only by adding a skip mode flag to a bit stream, and a value of a reference block is directly copied according to the motion vector as a reconstructed value of the current picture block. In addition, when the direct mode is used, an encoder may derive the motion vector of the current picture block by using the adjacent motion vectors, and directly copy the value of the reference block according to the motion vector as a predictor of the current picture block, and perform predictive coding on the current picture block by using the predictor in an encoder. In the evolved HEVC standard, some new coding tools are introduced to further improve video coding efficiency. A merge coding mode and an advanced motion vector prediction (AMVP) mode are two important inter-frame prediction tools. During merge coding, a candidate motion information set is constructed by using motion information (including a prediction direction, a motion vector, and a reference frame index) of an adjacent coded block of a current coding block, candidate motion information that enables coding efficiency to be the highest may be selected as motion information of the current coding block by means of comparison, a predictor of the current coding block is found in a reference frame, predictive coding is performed on the current coding block, and an index value indicating an adjacent coded block whose motion information is selected is written into a bitstream. When the advanced motion vector prediction mode is used, a motion vector of an adjacent coded block is used as a motion vector predictor of a current coding block, a motion vector that enables coding efficiency to be the highest may be selected to predict a motion vector of the current coding block, and an index value that indicates a selected adjacent motion vector may be written into a video bitstream.

The technical solutions in the embodiments of the present application are further discussed in the following.

The following first describes a picture prediction method provided in the embodiments of the present application. The picture prediction method provided in the embodiments of the present application is executed by a video coding apparatus or a video decoding apparatus. The video coding apparatus or the video decoding apparatus may be any apparatus that needs to output or store a video, for example, a laptop computer, a tablet computer, a personal computer, a mobile phone, or a video server.

In an embodiment of a picture prediction method in the present application, the picture prediction method includes: determining motion vector predictors (MVP) of K pixel samples in a current picture block, where K is an integer greater than 1, the K pixel samples include a first vertex angle pixel sample in the current picture block, a motion vector predictor of the first vertex angle pixel sample is obtained based on a motion vector of a preset first spatially adjacent picture block of the current picture block, and the first spatially adjacent picture block is spatially adjacent to the first vertex angle pixel sample; and performing, based on a non-translational motion model and the motion vector predictors of the K pixel samples, pixel value prediction on the current picture block.

Referring to FIG. 1-*c*, FIG. 1-*c* is a schematic flowchart of a picture prediction method according to an embodiment of the present application. As shown in an example of FIG. 1-*c*, the picture prediction method provided in this embodiment of the present application may include the following steps.

101. Determine motion vector predictors of K pixel samples in a current picture block.

K is an integer greater than 1, the K pixel samples include a first vertex angle pixel sample in the current picture block, and a motion vector predictor of the first vertex angle pixel sample is obtained based on a motion vector of a preset first spatially adjacent picture block of the current picture block. The first spatially adjacent picture block is spatially adjacent to the first vertex angle pixel sample.

Optionally, in some possible implementation manners of the present application, the motion vector predictor of the first vertex angle pixel sample is obtained based on the motion vector of the preset first spatially adjacent picture block of the current picture block. Specifically, the motion vector predictor of the first vertex angle pixel sample may be equal to the motion vector of the preset first spatially adjacent picture block of the current picture block (that is, the motion vector of the preset first spatially adjacent picture block of the current picture block is used as the motion vector predictor of the first vertex angle pixel sample); or a motion vector predictor obtained by performing preset transformation on the motion vector of the preset first spatially adjacent picture block of the current picture block may be used as the motion vector predictor of the first vertex angle pixel sample.

102. Perform, based on a non-translational motion model and the motion vector predictors of the K pixel samples, pixel value prediction on the current picture block.

Optionally, in some possible implementation manners of the present application, the non-translational motion model is any one of the following models: an affine transformation model, a parabolic motion model, a rotary motion model, a perspective motion model, a shearing motion model, or a scalable motion model. It may be understood that the non-translational motion model is not limited to the foregoing specific examples.

It may be learned that in the technical solution in this embodiment, determined motion vector predictors of K pixel samples are referenced during pixel value prediction performed, based on a non-translational motion model, on a current picture block. The K pixel samples include a first vertex angle pixel sample in the current picture block. The motion vector predictors of the K pixel samples are directly used for prediction, a motion vector predictor of the first vertex angle pixel sample in the K pixel samples is obtained based on a motion vector of a preset first spatially adjacent picture block of the current picture block, and there is a single optional case for the motion vector predictors of the K pixel samples. Therefore, a mechanism that is used in a conventional technology and in which motion vector predictors of K pixel samples are selected from multiple optional motion vector predictor sets of the K pixel samples by means of massive calculation is abandoned. This is helpful in avoiding transferring selection information of motion information predictors in a bitstream, is helpful in improving coding efficiency, and is also helpful in significantly reducing calculation complexity of picture prediction based on a non-translational motion model.

Further, the first spatially adjacent picture block is spatially adjacent to the first vertex angle pixel sample, and the first spatially adjacent picture block of the current picture block is preset (that is, it may be considered that the first spatially adjacent picture block of the current picture block is agreed or set in advance). In this way, this is helpful in quickly determining the motion vector predictors of the K pixel samples. In addition, because redundancy is removed by making full use of a spatial correlation between picture blocks, this is helpful in further improving coding efficiency.

There may be various manners of selecting the K pixel samples.

Optionally, in some possible implementation manners of the present application, the K pixel samples include at least two pixel samples in an upper left pixel sample, an upper right pixel sample, a lower left pixel sample, or a lower right pixel sample in the current picture block.

If the pixel sample is a pixel block, a size of the pixel block is, for example, 2×2, 1×2, 4×2, 4×4, or another size.

Optionally, in some possible implementation manners of the present application, the upper left pixel sample in the current picture block is an upper left vertex of the current picture block or a pixel block that is in the current picture block and that includes an upper left vertex of the current picture block. The lower left pixel sample in the current picture block is a lower left vertex of the current picture block or a pixel block that is in the current picture block and that includes a lower left vertex of the current picture block. The upper right pixel sample in the current picture block is an upper right vertex of the current picture block or a pixel block that is in the current picture block and that includes an upper right vertex of the current picture block. The lower right pixel sample in the current picture block is a lower right vertex of the current picture block or a pixel block that is in the current picture block and that includes a lower right vertex of the current picture block.

Optionally, in some possible implementation manners of the present application, the K pixel samples may further include a center pixel sample in the current picture block. The center pixel sample in the current picture block may be a center pixel in the current picture block or a pixel block that is in the current picture block and that includes a center pixel in the current picture block.

Optionally, in some possible implementation manners of the present application, the first spatially adjacent picture block may be a picture block X1, a picture block X2, a picture block X3, or a picture block X4.

A motion vector predictor of the upper left pixel sample in the current picture block may be obtained based on a motion vector of the picture block X1, the picture block X1 is a spatially adjacent picture block of the current picture block, and the picture block X1 is spatially adjacent to the upper left pixel sample in the current picture block.

A motion vector predictor of the upper right pixel sample in the current picture block may be obtained based on a motion vector of the picture block X2, the picture block X2 is a spatially adjacent picture block of the current picture block, and the picture block X2 is spatially adjacent to the upper right pixel sample in the current picture block.

A motion vector predictor of the lower left pixel sample in the current picture block may be obtained based on a motion vector of the picture block X3, the picture block X3 is a spatially adjacent picture block of the current picture block, and the picture block X3 is spatially adjacent to the lower left pixel sample in the current picture block.

A motion vector predictor of the lower right pixel sample in the current picture block may be obtained based on a motion vector of the picture block X4, the picture block X4 is a spatially adjacent picture block of the current picture block, and the picture block X4 is spatially adjacent to the lower right pixel sample in the current picture block.

Optionally, in some possible implementation manners of the present application, the first vertex angle pixel sample may be the upper left pixel sample in the current picture block, and the first spatially adjacent picture block may be the picture block X1. The picture block X1 is a spatially adjacent picture block on the upper left of the current picture block, or the picture block X1 is a spatially adjacent picture block on the left of the current picture block, or the picture block X1 is a spatially adjacent picture block above the current picture block.

Optionally, in some possible implementation manners of the present application, the picture block X2 is a spatially adjacent picture block above the current picture block, or the picture block X2 is a spatially adjacent picture block on the upper right of the current picture block, or the picture block X2 is a spatially adjacent picture block on the right of the current picture block. Still optionally, an absolute value of a difference between a motion vector absolute value of the picture block X2 and a motion vector absolute value of the picture block X1 is greater than or equal to an absolute value of a difference between a motion vector absolute value of a picture block X5 and the motion vector absolute value of the picture block X1, and the picture block X5 is any one of remaining at least some spatially adjacent picture blocks, other than the picture block X2, that are of the current picture block and that are spatially adjacent to the upper right vertex. That is, a location of the picture block X2 may be determined based on a specific policy, or a location of the picture block X2 may be directly agreed.

Optionally, in some possible implementation manners of the present application, the picture block X3 is a spatially adjacent picture block on the left of the current picture block, or the picture block X3 is a spatially adjacent picture block on the lower left of the current picture block, or the picture block X3 is a spatially adjacent picture block below the current picture block. Still optionally, an absolute value of a difference between a motion vector absolute value of the picture block X3 and the motion vector absolute value of the picture block X1 is greater than or equal to an absolute value of a difference between a motion vector absolute value of a picture block X6 and the motion vector absolute value of the picture block X1, and the picture block X6 is any one of remaining at least some spatially adjacent picture blocks, other than the picture block X3, that are of the current picture block and that are spatially adjacent to the lower left vertex. That is, a location of the picture block X3 may be determined based on a specific policy, or a location of the picture block X3 may be directly agreed.

Optionally, in some possible implementation manners of the present application, the picture block X4 is a spatially adjacent picture block on the right of the current picture block, or the picture block X4 is a spatially adjacent picture block on the lower right of the current picture block, or the picture block X4 is a spatially adjacent picture block below the current picture block. Still optionally, an absolute value of a difference between a motion vector absolute value of the picture block X4 and the motion vector absolute value of the picture block X1 is greater than or equal to an absolute value of a difference between a motion vector absolute value of a picture block X7 and the motion vector absolute value of the picture block X1, and the picture block X7 is any one of remaining at least some spatially adjacent picture blocks, other than the picture block X4, that are of the current picture block and that are spatially adjacent to the lower left vertex.

Referring to FIG. 2, FIG. 2 shows examples of some possible locations of the picture block X1, the picture block X2, the picture block X3, and the picture block X4.

Optionally, in some possible implementation manners of the present application, the performing, based on a non-translational motion model and the motion vector predictors of the K pixel samples, pixel value prediction on the current picture block may specifically include: if reference frames corresponding to the motion vector predictors of the K pixel samples are a reference frame Y1, performing motion estimation on the K pixel samples by using the motion vector predictors of the K pixel samples, to obtain motion vectors of the K pixel samples; and performing pixel value prediction on the current picture block by using the non-translational motion model and the motion vectors of the K pixel samples.

Optionally, in some possible implementation manners of the present application, the performing, based on a non-translational motion model and the motion vector predictors of the K pixel samples, pixel value prediction on the current picture block may specifically include: when reference frames corresponding to motion vector predictors of K1 pixel samples in the K pixel samples are not a reference frame Y1, scaling the motion vector predictors of the K1 pixel samples to the reference frame Y1; performing motion estimation on the K pixel samples by using motion vector predictors of K2 pixel samples and motion vector predictors that are of the K1 pixel samples and that are scaled to the reference frame Y1, to obtain motion vectors of the K pixel samples; and performing pixel value prediction on the current picture block by using the non-translational motion model and the motion vectors of the K pixel samples, where the K2 pixel samples are remaining pixel samples other than the K1 pixel samples in the K pixel samples, and K1 and K2 are positive integers.

Optionally, in some possible implementation manners of the present application, the reference frame Y1 may be a reference frame corresponding to the motion vector predictor of the first vertex angle pixel sample, or the reference frame Y1 may be a reference frame corresponding to a motion vector predictor of another pixel sample in the K pixel samples.

Optionally, in some possible implementation manners of the present application, a pixel sample i is any pixel sample except the first vertex angle pixel sample in the K pixel samples, and if a prediction direction corresponding to a motion vector predictor of the pixel sample i is different from a prediction direction corresponding to the motion vector predictor of the first vertex angle pixel sample, a reference frame index corresponding to the motion vector predictor of the pixel sample i is 0.

Optionally, in some possible implementation manners of the present application, that the motion vector predictor of the pixel sample i is scaled to the reference frame Y1 may include: if reference frame indexes corresponding to the motion vector predictors of the first vertex angle pixel sample and the pixel sample i are different, the motion vector predictor of the pixel sample i is scaled to the reference frame Y1.

Optionally, in some possible implementation manners of the present application, the performing motion estimation on the K pixel samples by using motion vector predictors of K2 pixel samples and motion vector predictors that are of the K1 pixel samples and that are scaled to the reference frame Y1, to obtain motion vectors of the K pixel samples may include: performing motion estimation on the K pixel samples based on an iterative search algorithm (or a motion estimation algorithm of another type) by using the motion vector predictors of the K2 pixel samples and the motion vector predictors that are of the K1 pixel samples and that are scaled to the reference frame Y1, to obtain the motion vectors of the K pixel samples.

Certainly, in some other possible application scenarios, a step of performing motion estimation on the K pixel samples may be omitted. A normalization step may even be omitted. That is, the following step may be omitted: when the reference frames corresponding to the motion vector predictors of the K1 pixel samples in the K pixel samples are not the reference frame Y1, the motion vector predictors of the K1 pixel samples are scaled to the reference frame Y1.

It may be understood that any one of the foregoing picture prediction methods provided in this embodiment may be applied to a video coding process or a video decoding process.

To help better understand and implement the foregoing solutions in the embodiments of the present application, the following provides further descriptions with reference to a more specific application scenario.

Referring to FIG. 3-a, FIG. 3-a is a schematic flowchart of another picture prediction method according to another embodiment of the present application. As shown in an example of FIG. 3-a, the another picture prediction method provided in the another embodiment of the present application may include the following steps.

301. Determine motion vector predictors of K pixel samples in a current picture block.

In an example of this embodiment, K=3.

In this embodiment, the K pixel samples include an upper left vertex, an upper right vertex, and a lower left vertex of the current picture block.

As shown in an example of FIG. 3-b, a motion vector predictor of the upper left vertex of the current picture block is equal to a motion vector of an adjacent picture block A on the upper left of the current picture block. A motion vector predictor of the upper right vertex of the current picture block is equal to a motion vector of an adjacent picture block B above the current picture block, or a motion vector predictor of the upper right vertex of the current picture block may be equal to a motion vector of an adjacent picture block C on the upper right of the current picture block. A motion vector predictor of the lower left vertex of the current picture block may be equal to a motion vector of an adjacent picture block E on the lower left of the current picture block, or a motion vector predictor of the lower left vertex of the current picture block may be equal to a motion vector of an adjacent picture block D on the left of the current picture block.

For example, the motion vector predictors of the upper right vertex and the lower left vertex of the current picture block may be determined based on the following formulas:

$$\overline{mvp_1} = \begin{cases} \overline{mv_B}, & \text{if } \text{abs}(|\overline{mv_B}| - |\overline{mv_A}|) \geq \text{abs}(|\overline{mv_C}| - |\overline{mv_A}|) \\ \overline{mv_C}, & \text{if } \text{abs}(|\overline{mv_B}| - |\overline{mv_A}|) < \text{abs}(|\overline{mv_C}| - |\overline{mv_A}|) \end{cases} \quad \text{formula (1)}$$

-continued $$\overline{mvp_2} = \begin{cases} \overline{mv_D}, & \text{if } \operatorname{abs}(|\overline{mv_D}| - |\overline{mv_A}|) \geq \operatorname{abs}(|\overline{mv_E}| - |\overline{mv_A}|) \\ \overline{mv_E}, & \text{if } \operatorname{abs}(|\overline{mv_D}| - |\overline{mv_A}|) < \operatorname{abs}(|\overline{mv_E}| - |\overline{mv_A}|) \end{cases} \quad \text{formula (2)}$$

In the foregoing formula (1) and formula (2), $\overrightarrow{mv_A}$ represents the motion vector (MV) of the picture block A.

In the foregoing formula (1), $\overrightarrow{mvp_1}$ represents an MVP of the upper right vertex of the current picture block, $\overrightarrow{mv_B}$ represents the MV of the picture block B, and $\overrightarrow{mv_C}$ represents the MV of the picture block C. In the foregoing formula (2), $\overrightarrow{mvp_2}$ represents the MVP of the upper right vertex of the current picture block, $\overrightarrow{mv_D}$ represents the MV of the picture block D, and $\overrightarrow{mv_E}$ represents the MV of the picture block E.

That is, for the MVP of the upper right vertex, a picture block that has a larger difference with a motion vector absolute value of the block A is selected from the spatially adjacent picture block B and picture block C. For the MVP of the lower left vertex, a picture block that has a larger difference with the motion vector absolute value of the block A is selected from the spatially adjacent picture block D and picture block E.

302. Perform motion estimation on the K pixel samples by using the motion vector predictors of the K pixel samples, to obtain motion vectors of the K pixel samples.

When reference frames corresponding to motion vector predictors of K1 pixel samples in the K pixel samples are not a reference frame Y1, the performing motion estimation on the K pixel samples by using the motion vector predictors of the K pixel samples, to obtain motion vectors of the K pixel samples includes: scaling the motion vector predictors of the K1 pixel samples to the reference frame Y1 (that is, performing normalization processing on the motion vector predictors of the K1 pixel samples); and performing motion estimation on the K pixel samples by using motion vector predictors of K2 pixel samples and motion vector predictors that are of the K1 pixel samples and that are scaled to the reference frame Y1, to obtain the motion vectors of the K pixel samples.

Before normalization processing is performed on the motion vector predictors of the K1 pixel samples, a reference frame index of a motion vector predictor of a pixel sample i may be first revised. The pixel sample i is any pixel sample (for example, the lower left vertex or the upper right vertex), except the upper left vertex of the current picture block, in the K pixel samples. If a prediction direction corresponding to the motion vector predictor of the pixel sample i is different from a prediction direction corresponding to the motion vector predictor of the upper left vertex (for example, the prediction direction corresponding to the motion vector predictor of the pixel sample i is forward prediction, and the prediction direction corresponding to the motion vector predictor of the upper left vertex is backward prediction; or the prediction direction corresponding to the motion vector predictor of the pixel sample i is backward prediction, and the prediction direction corresponding to the motion vector predictor of the upper left vertex is forward prediction), a reference frame index corresponding to the motion vector predictor of the pixel sample i is 0.

Optionally, in some possible implementation manners of the present application, a method for scaling a motion vector predictor to a reference frame may be as follows: It is assumed that a current coding frame index is CurPoc, and a reference frame of the picture block A (that is, a reference frame corresponding to the MVP of the upper left vertex) is a destination reference frame. A destination reference frame index is DesPoc, a reference frame corresponding to the MVP of the upper right vertex or the lower left vertex is a source reference frame, a source reference frame index is SrcPoc, the motion vector predictor of the upper right vertex or the lower left vertex is MVP, and a motion vector predictor that is of the upper right vertex or the lower left vertex and that is obtained after scaling is MVs. As shown in FIG. 3-c, MVs may be obtained by means of calculation by using the following formulas:

$$MV_S = \operatorname{sign}(ScaleFactor \times MVP) \times \operatorname{abs}(ScaleFactor \times MVP)$$

$$ScaleFactor = \frac{CurPoc - DesPoc}{CurPoc - SrcPoc}$$

Particularly, if reference frames corresponding to the motion vector predictors of the K pixel samples are the reference frame Y1, no normalization processing is performed on the motion vector predictors of the K1 pixel samples (because the motion vector predictors of the K1 pixel samples have been in a normalized state), and motion estimation may be performed on the K pixel samples directly by using the motion vector predictors of the K pixel samples, to obtain the motion vectors of the K pixel samples.

Optionally, that motion estimation is performed on the K pixel samples to obtain the motion vectors of the K pixel samples may include: motion estimation is performed on the K pixel samples based on an iterative search algorithm, to obtain the motion vectors of the K pixel samples.

Optionally, in some possible implementation manners of the present application, that motion estimation is performed on the K pixel samples based on each iteration in the iterative search algorithm, to obtain the motion vectors of the K pixel samples may include the following steps.

S1. Calculate $\phi_k(p)$ of each pixel according to formulas (3), (4), and (5).

In $\phi_k(p)$, k=1, 2, 3.

As shown in FIG. 3-d, it is assumed that a size of a current picture block X is S1×S2, and coordinates of each pixel p in the current picture block X are (x, y).

$$\phi_1(p) = 1 - \frac{y}{S_2 - 1} - \frac{x}{S_1 - 1} \qquad \text{formula (3)}$$

$$\phi_2(p) = \frac{x}{S_1 - 1} \qquad \text{formula (4)}$$

$$\phi_3(p) = \frac{y}{S_2 - 1} \qquad \text{formula (5)}$$

S2. Calculate $\Psi_{1,x}'(p)$ and $\Psi_{1,y}'(p)$.

$\Psi_{1,x}'(p)$ and $\Psi_{1,y}'(p)$ respectively represent derivatives of each pixel p in the current picture block X in a direction x and a direction y. In an example of this embodiment, the derivatives are calculated by using a Sobel operator. Another operator (for example, a Gaussian operation) may be used. Templates of the Sobel operator are shown in examples of formula (6) and formula (7).

$$sobel_x = \begin{bmatrix} -1 & 0 & 1 \\ -2 & 0 & 2 \\ -1 & 0 & 1 \end{bmatrix} \quad \text{formula (6)}$$

$$sobel_y = \begin{bmatrix} 1 & 2 & 1 \\ 0 & 0 & 0 \\ -1 & -2 & -1 \end{bmatrix} \quad \text{formula (7)}$$

Assuming that coordinates of a current pixel p are (x, y), calculation formulas of $\Psi_{1,x}'(p)$ and $\Psi_{1,y}'(p)$ are shown in examples of formula (8) and formula (9), where pred[x][y] represents a predicted pixel value of a pixel that is in the current picture block X and whose coordinates are (x, y).

$$\psi'_{1,x}(p) = \begin{pmatrix} pred[x+1][y-1] - pred[x-1][y-1] + \\ 2 \times pred[x+1][y] - 2 \times pred[x-1][y] + \\ pred[x+1][y+1] - pred[x-1][y+1] \end{pmatrix} \bigg/ 8 \quad \text{formula (8)}$$

$$\psi'_{1,y}(p) = \begin{pmatrix} pred[x-1][y+1] - pred[x-1][y-1] + \\ 2 \times pred[x][y+1] - 2 \times pred[x][y-1] + \\ pred[x+1][y+1] - pred[x+1][y-1] \end{pmatrix} \bigg/ 8 \quad \text{formula (9)}$$

An adjacent pixel of a pixel located on the edge of the current picture block X may not exist, and $\Psi_{1,x}'(p)$ and $\Psi_{1,y}'(p)$ may be replaced with corresponding values of the adjacent pixel of the pixel located on the edge of the current picture block X.

S3. Calculate a prediction error e(p).

It is assumed that the coordinates of the current pixel p are (x, y).

$$e(p) = org[x][y] - pred[x][y] \quad \text{formula (10)}$$

where org[x][y] and pred[x][y] respectively represent an original pixel value and a predicated pixel value of the pixel that is in the current picture block X and whose coordinates are (x, y).

S4. Assuming that $\delta_{x1}$, $\delta_{x2}$, $\delta_{x3}$, $\delta_{y1}$, $\delta_{y2}$, and $\delta_{y3}$ are respectively motion vector variations of three vertices of a current picture block X in a direction x and a direction y, obtain $\delta_{x1}$, $\delta_{x2}$, $\delta_{x3}$, $\delta_{y1}$, $\delta_{y2}$, and $\delta_{y3}$ by means of calculation by solving a linear equation set (11).

$$H_{xkl}\delta_{xk} = g_{xk}, k = 1, 2, 3 \quad \text{equation set (11)}$$

$$H_{ykl}\delta_{yk} = g_{yk}, k = 1, 2, 3$$

$$H_{xkl} = \begin{bmatrix} H_{x,11} & H_{x,12} & H_{x,13} \\ H_{x,21} & H_{x,22} & H_{x,23} \\ H_{x,31} & H_{x,32} & H_{x,33} \end{bmatrix};$$

where $$H_{ykl} = \begin{bmatrix} H_{y,11} & H_{y,12} & H_{y,13} \\ H_{y,21} & H_{y,22} & H_{y,23} \\ H_{y,31} & H_{y,32} & H_{y,33} \end{bmatrix};$$

$$g_{xk} = \begin{bmatrix} g_{x,1} \\ g_{x,2} \\ g_{x,3} \end{bmatrix}; \quad g_{yk} = \begin{bmatrix} g_{y,1} \\ g_{y,2} \\ g_{y,3} \end{bmatrix};$$

$$\delta_x = \begin{bmatrix} \delta_{x,1} \\ \delta_{x,2} \\ \delta_{x,3} \end{bmatrix}; \quad \delta_y = \begin{bmatrix} \delta_{y,1} \\ \delta_{y,2} \\ \delta_{y,3} \end{bmatrix};$$

-continued $$H_{xkl} = \sum_p \phi_k(p)\phi_l(p)(\psi'_{1,x}(p))^2$$

$k = 1, 2, 3; l = 1, 2, 3;$ $$H_{ykl} = \sum_p \phi_k(p)\phi_l(p)(\psi'_{1,y}(p))^2,$$

$k = 1, 2, 3; l = 1, 2, 3;$ $$g_{xk} = \sum_p e(p)\phi_k(p)\psi'_{1,x}(p), k = 1, 2, 3; \text{ and}$$

$$g_{yk} = \sum_p e(p)\phi_k(p)\psi'_{1,y}(p), k = 1, 2, 3.$$

Based on the foregoing steps S1 to S4, a motion vector variation $\delta_x$ of each of the three pixel samples in the current picture block in the direction x and a motion vector variation $\delta_y$ of each pixel sample in the direction y in this iteration may be obtained by means of motion estimation.

One or more iterations are performed based on an iterative manner in the foregoing steps S1 to S4, so that the motion vectors of the K pixel samples in the current picture block can be obtained by means of motion estimation.

Optionally, in some possible implementation manners of the present application, subtraction may be further performed between the motion vectors that are of the K pixel samples and that are obtained by means of motion estimation and the corresponding MVPs, to obtain motion vector differences (MVD) of the K pixel samples, and the MVDs of the K pixel samples may be written into a video bitstream.

Further, a syntactic element affine_no_MVD_flag may be used to indicate whether to write an MVD corresponding to a pixel sample into the video bitstream. For example, if the MVDs corresponding to the foregoing K pixel samples are all 0, affine_no_MVD_flag may be set to true, and no MVD is written into the video bitstream; or if the MVDs corresponding to the foregoing K pixel samples are not all 0, affine_no_MVD_flag may be set to false, and the MVDs corresponding to the K pixel samples are written into the video bitstream.

303. Calculate, based on an affine transformation model and the motion vectors of the K pixel samples, a motion vector of each pixel in the current picture block.

It is assumed that the size of the current prediction block X is S1×S2. Motion vectors $(vx_0, vy_0)$, $(vx_1, vy_1)$, and $(vx_2, vy_2)$ of three vertices whose coordinates are (0,0), $(S_1, 0)$, and $(0, S_2)$ are calculated by performing step 301 and step 302.

The coordinates and the motion vectors of the three vertices are substituted into an affine transformation formula (12), so that the motion vector of each pixel in the current picture block can be calculated. A schematic diagram of affine transformation may be shown in FIG. 3-e.

A motion vector of the pixel whose coordinates are (x, y) is calculated as follows:

$$\begin{cases} vx = \dfrac{vx_1 - vx_0}{S_1}x + \dfrac{vx_2 - vx_0}{S_2}y + vx_0 \\ vy = \dfrac{vy_1 - vy_0}{S_1}x + \dfrac{vy_2 - vy_0}{S_2}y + vy_0 \end{cases} \quad \text{formula (12)}$$

Further, because motion information of each pixel in the current picture block may be used for motion vector prediction for another picture block, one piece of motion information may be stored for each 4×4 block, and a motion vector of each 4×4 block is stored as motion information of a pixel on an upper left corner or any other pixel in the 4×4 block.

It should be noted that in this embodiment, the affine transformation model is mainly used as an example of a non-translational motion model for description, and a mechanism for calculating, based on another non-translational motion model and the motion vectors of the K pixel samples, the motion vector of each pixel in the current picture block has a similar principle although formulas different from those used in this embodiment may be used in the mechanism. Examples are not listed one by one herein.

304. Perform, based on the calculated motion vector of each pixel in the current picture block, pixel value prediction on the current picture block.

Further, during video coding, a residual of the current picture block may be obtained by using an original pixel value of the current picture block and a predicted pixel value that is of the current picture block and that is obtained by means of pixel value prediction, and the residual of the current picture block may be written into the video bitstream.

It may be learned that in the technical solution in this embodiment, determined motion vector predictors of K pixel samples are referenced during pixel value prediction performed, based on a non-translational motion model, on a current picture block. The K pixel samples include a first vertex angle pixel sample in the current picture block. The motion vector predictors of the K pixel samples are directly used for prediction, a motion vector predictor of the first vertex angle pixel sample in the K pixel samples is obtained based on a motion vector of a preset first spatially adjacent picture block of the current picture block, and there is a single optional case for the motion vector predictors of the K pixel samples. Therefore, a mechanism that is used in a conventional technology and in which motion vector predictors of K pixel samples are selected from multiple optional motion vector predictor sets of the K pixel samples by means of massive calculation is abandoned. This is helpful in avoiding transferring selection information of motion information predictors in a bitstream, is helpful in improving coding efficiency, and is also helpful in significantly reducing calculation complexity of picture prediction based on a non-translational motion model.

Further, prediction directions of the MVPs of the K pixel samples in the current picture block are normalized, reference frame indexes are processed, and motion vectors corresponding to the MVPs of the K pixel samples are scaled and mapped to a same reference frame according to reference frame indexes. Further, a motion vector of each pixel in the current picture block may be calculated according to optimal motion vectors of the K pixel samples by using an affine transformation formula. The foregoing solution is helpful in resolving a problem that inter-frame prediction accuracy is low in a current video coding standard when a video includes content of a non-translational feature, for example, lens zooming, object deformation, or moving object rotation. In addition, a disadvantage that an affine transformation technology proposed in the conventional technology is hardly applied to multi-direction prediction and multiple-reference-frames-based prediction is overcome, and this is helpful in making full use of a temporary correlation between video sequences to remove temporary redundancy, thereby improving coding efficiency.

Referring to FIG. 4-*a*, FIG. 4-*a* is a schematic flowchart of another picture prediction method according to another embodiment of the present application. As shown in an example of FIG. 4-*a*, the another picture prediction method provided in the another embodiment of the present application may include the following steps.

401. Determine motion vector predictors of K pixel samples in a current picture block.

In an example of this embodiment, K=3.

In this embodiment, the K pixel samples include an upper left vertex, an upper right vertex, and a lower left vertex of the current picture block.

As shown in an example of FIG. 4-*b*, a motion vector predictor of the upper left vertex of the current picture block is equal to a motion vector of an adjacent picture block A on the upper left of the current picture block. A motion vector predictor of the upper right vertex of the current picture block is equal to a motion vector of an adjacent picture block B above the current picture block. A motion vector predictor of the lower left vertex of the current picture block may be equal to a motion vector of an adjacent picture block D on the left of the current picture block.

402. Perform motion estimation on the K pixel samples by using the motion vector predictors of the K pixel samples, to obtain motion vectors of the K pixel samples.

When reference frames corresponding to motion vector predictors of K1 pixel samples in the K pixel samples are not a reference frame Y1, the performing motion estimation on the K pixel samples by using the motion vector predictors of the K pixel samples, to obtain motion vectors of the K pixel samples includes: scaling the motion vector predictors of the K1 pixel samples to the reference frame Y1 (that is, performing normalization processing on the motion vector predictors of the K1 pixel samples); and performing motion estimation on the K pixel samples by using motion vector predictors of K2 pixel samples and motion vector predictors that are of the K1 pixel samples and that are scaled to the reference frame Y1, to obtain the motion vectors of the K pixel samples.

Before normalization processing is performed on the motion vector predictors of the K1 pixel samples, a reference frame index of a motion vector predictor of a pixel sample i may be first revised. The pixel sample i is any pixel sample (for example, the lower left vertex or the upper right vertex), except the upper left vertex of the current picture block, in the K pixel samples. If a prediction direction corresponding to the motion vector predictor of the pixel sample i is different from a prediction direction corresponding to the motion vector predictor of the upper left vertex (for example, the prediction direction corresponding to the motion vector predictor of the pixel sample i is forward prediction, and the prediction direction corresponding to the motion vector predictor of the upper left vertex is backward prediction; or the prediction direction corresponding to the motion vector predictor of the pixel sample i is backward prediction, and the prediction direction corresponding to the motion vector predictor of the upper left vertex is forward prediction), a reference frame index corresponding to the motion vector predictor of the pixel sample i is 0.

Optionally, in some possible implementation manners of the present application, a method for scaling a motion vector predictor to a reference frame may be as follows: It is assumed that a current coding frame index is CurPoc, and a reference frame of the picture block A (that is, a reference frame corresponding to the MVP of the upper left vertex) is a destination reference frame. A destination reference frame index is DesPoc, a reference frame corresponding to the MVP of the upper right vertex or the lower left vertex is a source reference frame, a source reference frame index is SrcPoc, the motion vector predictor of the upper right vertex or the lower left vertex is MVP, and a motion vector predictor that is of the upper right vertex or the lower left vertex and that is obtained after scaling is MVs. MVs may be obtained by means of calculation by using the following formulas:

$$MV_S = \text{sign}(ScaleFactor \times MVP) \times \text{abs}(ScaleFactor \times MVP)$$

$$ScaleFactor = \frac{CurPoc - DesPoc}{CurPoc - SrcPoc}$$

Particularly, if reference frames corresponding to the motion vector predictors of the K pixel samples are the reference frame Y1, no normalization processing is performed on the motion vector predictors of the K1 pixel samples (because the motion vector predictors of the K1 pixel samples have been in a normalized state), and motion estimation may be performed on the K pixel samples directly by using the motion vector predictors of the K pixel samples, to obtain the motion vectors of the K pixel samples.

Optionally, that motion estimation is performed on the K pixel samples to obtain the motion vectors of the K pixel samples may include: motion estimation is performed on the K pixel samples based on an iterative search algorithm, to obtain the motion vectors of the K pixel samples. For a specific iterative search algorithm, refer to related descriptions in the foregoing embodiment. Details are not described herein again.

Optionally, in some possible implementation manners of the present application, subtraction may be further performed between the motion vectors that are of the K pixel samples and that are obtained by means of motion estimation and the corresponding MVPs, to obtain MVDs of the K pixel samples, and the MVDs of the K pixel samples may be written into a video bitstream.

Further, a syntactic element affine_no_MVD_flag may be used to indicate whether to write an MVD corresponding to a pixel sample into the video bitstream. For example, if the MVDs corresponding to the foregoing K pixel samples are all 0, affine_no_MVD_flag may be set to true, and no MVD is written into the video bitstream; or if the MVDs corresponding to the foregoing K pixel samples are not all 0, affine_no_MVD_flag may be set to false, and the MVDs corresponding to the K pixel samples are written into the video bitstream.

403. Calculate, based on an affine transformation model and the motion vectors of the K pixel samples, a motion vector of each pixel in the current picture block.

Further, because motion information of each pixel in the current picture block may be used for motion vector prediction for another picture block, one piece of motion information may be stored for each 4×4 (or 8×8) block, and a motion vector of each 4×4 (or 8×8) block is stored as motion information of a pixel on an upper left corner or any other pixel in the 4×4 (or 8×8) block.

The motion information may include a motion vector, a prediction direction corresponding to the motion vector, and a reference frame index corresponding to the motion vector.

It should be noted that in this embodiment, the affine transformation model is mainly used as an example of a non-translational motion model for description, and a mechanism for calculating, based on another non-translational motion model and the motion vectors of the K pixel samples, the motion vector of each pixel in the current picture block has a similar principle although formulas different from those used in this embodiment may be used in the mechanism. Examples are not listed one by one herein.

404. Perform, based on the calculated motion vector of each pixel in the current picture block, pixel value prediction on the current picture block.

Further, during video coding, a residual of the current picture block may be obtained by using an original pixel value of the current picture block and a predicted pixel value that is of the current picture block and that is obtained by means of pixel value prediction, and the residual of the current picture block may be written into the video bitstream.

It may be learned that in the technical solution in this embodiment, determined motion vector predictors of K pixel samples are referenced during pixel value prediction performed, based on a non-translational motion model, on a current picture block. The K pixel samples include a first vertex angle pixel sample in the current picture block. The motion vector predictors of the K pixel samples are directly used for prediction, a motion vector predictor of the first vertex angle pixel sample in the K pixel samples is obtained based on a motion vector of a preset first spatially adjacent picture block of the current picture block, and there is a single optional case for the motion vector predictors of the K pixel samples. Therefore, a mechanism that is used in a conventional technology and in which motion vector predictors of K pixel samples are selected from multiple optional motion vector predictor sets of the K pixel samples by means of massive calculation is abandoned. This is helpful in avoiding transferring selection information of motion information predictors in a bitstream, is helpful in improving coding efficiency, and is also helpful in significantly reducing calculation complexity of picture prediction based on a non-translational motion model.

Further, prediction directions of the MVPs of the K pixel samples in the current picture block are normalized, reference frame indexes are processed, and motion vectors corresponding to the MVPs of the K pixel samples are scaled and mapped to a same reference frame according to reference frame indexes. Further, a motion vector of each pixel in the current picture block may be calculated according to optimal motion vectors of the K pixel samples by using an affine transformation formula. The foregoing solution is helpful in resolving a problem that inter-frame prediction accuracy is low in a current video coding standard when a video includes content of a non-translational feature, for example, lens zooming, object deformation, or moving object rotation. In addition, a disadvantage that an affine transformation technology proposed in the conventional technology is hardly applied to multi-direction prediction and multiple-reference-frames-based prediction is overcome, and this is helpful in making full use of a temporary correlation between video sequences to remove temporary redundancy, thereby improving coding efficiency.

Referring to FIG. 5, FIG. 5 is a schematic flowchart of another picture prediction method according to another embodiment of the present application. As shown in an example of FIG. 5, the another picture prediction method provided in the another embodiment of the present application may include the following steps.

501. Determine motion vector predictors of K pixel samples in a current picture block.

In an example of this embodiment, K=3.

In this embodiment, the K pixel samples include an upper left vertex, an upper right vertex, and a lower left vertex of the current picture block.

For a specific manner of determining the motion vector predictors of the K pixel samples in the current picture block in step 501, refer to any manner in the foregoing embodiment.

502. Use the motion vector predictors of the foregoing K pixel samples as motion vectors of the foregoing K pixel samples, and calculate, based on an affine transformation model and the motion vectors of the K pixel samples, a motion vector of each pixel in the current picture block.

Further, because motion information of each pixel in the current picture block may be used for motion vector prediction for another picture block, one piece of motion information may be stored for each 4×4 (or 8×8) block, and a motion vector of each 4×4 (or 8×8) block is stored as motion information of a pixel on an upper left corner or any other pixel in the 4×4 (or 8×8) block.

The motion information may include a motion vector, a prediction direction corresponding to the motion vector, and a reference frame index corresponding to the motion vector.

It should be noted that in this embodiment, the affine transformation model is mainly used as an example of a non-translational motion model for description, and a mechanism for calculating, based on another non-translational motion model and the motion vectors of the K pixel samples, the motion vector of each pixel in the current picture block has a similar principle although formulas different from those used in this embodiment may be used in the mechanism. Examples are not listed one by one herein.

503. Perform, based on the calculated motion vector of each pixel in the current picture block, pixel value prediction on the current picture block.

Further, during video coding, a residual of the current picture block may be obtained by using an original pixel value of the current picture block and a predicted pixel value that is of the current picture block and that is obtained by means of pixel value prediction, and the residual of the current picture block may be written into a video bitstream.

It may be learned that in the technical solution in this embodiment, determined motion vector predictors of K pixel samples are referenced during pixel value prediction performed, based on a non-translational motion model, on a current picture block. The K pixel samples include a first vertex angle pixel sample in the current picture block. The motion vector predictors of the K pixel samples are directly used for prediction, a motion vector predictor of the first vertex angle pixel sample in the K pixel samples is obtained based on a motion vector of a preset first spatially adjacent picture block of the current picture block, and there is a single optional case for the motion vector predictors of the K pixel samples. Therefore, a mechanism that is used in a conventional technology and in which motion vector predictors of K pixel samples are selected from multiple optional motion vector predictor sets of the K pixel samples by means of massive calculation is abandoned. This is helpful in avoiding transferring selection information of motion information predictors in a bitstream, is helpful in improving coding efficiency, and is also helpful in significantly reducing calculation complexity of picture prediction based on a non-translational motion model.

Further, prediction directions of the MVPs of the K pixel samples in the current picture block are normalized, reference frame indexes are processed, and motion vectors corresponding to the MVPs of the K pixel samples are scaled and mapped to a same reference frame according to reference frame indexes. The foregoing solution is helpful in resolving a problem that inter-frame prediction accuracy is low in a current video coding standard when a video includes content of a non-translational feature, for example, lens zooming, object deformation, or moving object rotation. In addition, a disadvantage that an affine transformation technology proposed in the conventional technology is hardly applied to multi-direction prediction and multiple-reference-frames-based prediction is overcome, and this is helpful in making full use of a temporary correlation between video sequences to remove temporary redundancy, thereby improving coding efficiency.

Figure 6:
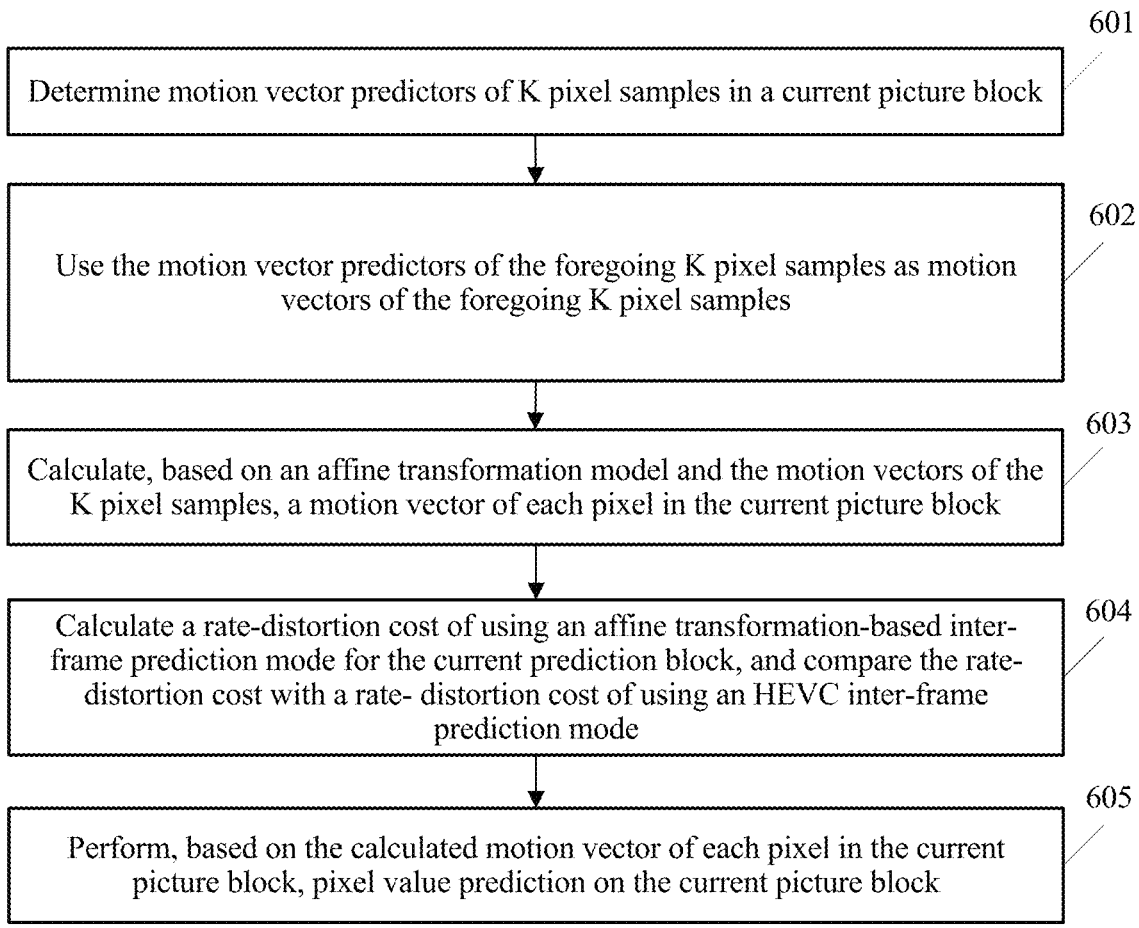
FIG. 6 is a schematic flowchart of another picture prediction method according to an embodiment of the present application.

Referring to FIG. 6, FIG. 6 is a schematic flowchart of another picture prediction method according to another embodiment of the present application. As shown in an example of FIG. 6, the another picture prediction method provided in the another embodiment of the present application may include the following steps.

601. Determine motion vector predictors of K pixel samples in a current picture block.

In an example of this embodiment, K=3.

In this embodiment, the K pixel samples include an upper left vertex, an upper right vertex, and a lower left vertex of the current picture block.

For a specific manner of determining the motion vector predictors of the K pixel samples in the current picture block in step 601, refer to any manner in the foregoing embodiment.

602. Perform motion estimation on the K pixel samples by using the motion vector predictors of the K pixel samples, to obtain motion vectors of the K pixel samples.

When reference frames corresponding to motion vector predictors of K1 pixel samples in the K pixel samples are not a reference frame Y1, the performing motion estimation on the K pixel samples by using the motion vector predictors of the K pixel samples, to obtain motion vectors of the K pixel samples includes: scaling the motion vector predictors of the K1 pixel samples to the reference frame Y1 (that is, performing normalization processing on the motion vector predictors of the K1 pixel samples); and performing motion estimation on the K pixel samples by using motion vector predictors of K2 pixel samples and motion vector predictors that are of the K1 pixel samples and that are scaled to the reference frame Y1, to obtain the motion vectors of the K pixel samples.

Before normalization processing is performed on the motion vector predictors of the K1 pixel samples, a reference frame index of a motion vector predictor of a pixel sample i may be first revised. The pixel sample i is any pixel sample (for example, the lower left vertex or the upper right vertex), except the upper left vertex of the current picture block, in the K pixel samples. If a prediction direction corresponding to the motion vector predictor of the pixel sample i is different from a prediction direction corresponding to the motion vector predictor of the upper left vertex (for example, the prediction direction corresponding to the motion vector predictor of the pixel sample i is forward prediction, and the prediction direction corresponding to the motion vector predictor of the upper left vertex is backward prediction; or the prediction direction corresponding to the motion vector predictor of the pixel sample i is backward prediction, and the prediction direction corresponding to the motion vector predictor of the upper left vertex is forward prediction), a reference frame index corresponding to the motion vector predictor of the pixel sample i is 0.

Particularly, if reference frames corresponding to the motion vector predictors of the K pixel samples are the reference frame Y1, no normalization processing is performed on the motion vector predictors of the K1 pixel samples (because the motion vector predictors of the K1 pixel samples have been in a normalized state), and motion estimation may be performed on the K pixel samples directly by using the motion vector predictors of the K pixel samples, to obtain the motion vectors of the K pixel samples.

Optionally, that motion estimation is performed on the K pixel samples to obtain the motion vectors of the K pixel samples may include: motion estimation is performed on the K pixel samples based on an iterative search algorithm, to obtain the motion vectors of the K pixel samples. For a specific iterative search algorithm, refer to related descriptions in the foregoing embodiment. Details are not described herein again.

Optionally, in some possible implementation manners of the present application, subtraction may be further performed between the motion vectors that are of the K pixel samples and that are obtained by means of motion estimation and the corresponding MVPs, to obtain MVDs of the K pixel samples, and the MVDs of the K pixel samples may be written into a video bitstream.

Further, a syntactic element affine_no_MVD_flag may be used to indicate whether to write an MVD corresponding to a pixel sample into the video bitstream. For example, if the MVDs corresponding to the foregoing K pixel samples are all 0, affine_no_MVD_flag may be set to true, and no MVD is written into the video bitstream; or if the MVDs corresponding to the foregoing K pixel samples are not all 0, affine_no_MVD_flag may be set to false, and the MVDs corresponding to the K pixel samples are written into the video bitstream.

603. Calculate, based on an affine transformation model and the motion vectors of the K pixel samples, a motion vector of each pixel in the current picture block.

Further, because motion information of each pixel in the current picture block may be used for motion vector prediction for another picture block, one piece of motion information may be stored for each 4×4 (or 8×8) block, and a motion vector of each 4×4 (or 8×8) block is stored as motion information of a pixel on an upper left corner or any other pixel in the 4×4 (or 8×8) block.

The motion information may include a motion vector, a prediction direction corresponding to the motion vector, and a reference frame index corresponding to the motion vector.

It should be noted that in this embodiment, the affine transformation model is mainly used as an example of a non-translational motion model for description, and a mechanism for calculating, based on another non-translational motion model and the motion vectors of the K pixel samples, the motion vector of each pixel in the current picture block has a similar principle although formulas different from those used in this embodiment may be used in the mechanism. Examples are not listed one by one herein.

604. Calculate a rate-distortion cost of using an affine transformation-based inter-frame prediction mode (step 601 to step 603) for the current prediction unit, and compare the rate-distortion cost with a calculated rate-distortion cost of using an HEVC inter-frame prediction mode.

If the rate-distortion cost of using the affine transformation-based inter-frame prediction mode is less than the rate-distortion cost of using the HEVC inter-frame prediction mode, an optimal inter-frame prediction mode of the current picture block is set to the affine transformation-based inter-frame prediction mode. Specifically, a syntactic element affine_MC_flag may be set to true to indicate that the optimal inter-frame prediction mode of the current picture block is the affine transformation-based inter-frame prediction mode. If the rate-distortion cost of using the affine transformation-based inter-frame prediction mode is not less than the rate-distortion cost of using the HEVC inter-frame prediction mode, a syntactic element affine_MC_flag is set to false to indicate that an optimal inter-frame prediction mode of the current picture block is the HEVC inter-frame prediction mode.

605. Perform, based on the calculated motion vector of each pixel in the current picture block, pixel value prediction on the current picture block.

For example, for a luminance component, if the motion vector of the pixel is ¼ pixel precision, a predicted pixel value of each pixel may be obtained by using an HEVC interpolation filter; or if the motion vector of the pixel is greater than ¼ pixel precision, predicted pixel values of four ¼ pixels at the shortest distance from the pixel are first obtained by using an HEVC interpolation filter, and then, bilinear interpolation is performed to obtain a predicted pixel value of the pixel. For a chrominance component, a predicted pixel value is obtained by using the HEVC interpolation filter.

Further, during video coding, a residual of the current picture block may be obtained by using an original pixel value of the current picture block and a predicted pixel value that is of the current picture block and that is obtained by means of pixel value prediction, and the residual of the current picture block is written into the video bitstream. Specifically, the residual of the current prediction unit is written into the video bitstream after undergoing transformation, quantization, and entropy encoding.

It may be learned that in the technical solution in this embodiment, determined motion vector predictors of K pixel samples are referenced during pixel value prediction performed, based on a non-translational motion model, on a current picture block. The K pixel samples include a first vertex angle pixel sample in the current picture block. The motion vector predictors of the K pixel samples are directly used for prediction, a motion vector predictor of the first vertex angle pixel sample in the K pixel samples is obtained based on a motion vector of a preset first spatially adjacent picture block of the current picture block, and there is a single optional case for the motion vector predictors of the K pixel samples. Therefore, a mechanism that is used in a conventional technology and in which motion vector predictors of K pixel samples are selected from multiple optional motion vector predictor sets of the K pixel samples by means of massive calculation is abandoned. This is helpful in avoiding transferring selection information of motion information predictors in a bitstream, is helpful in improving coding efficiency, and is also helpful in significantly reducing calculation complexity of picture prediction based on a non-translational motion model.

Further, prediction directions of the MVPs of the K pixel samples in the current picture block are normalized, reference frame indexes are processed, and motion vectors corresponding to the MVPs of the K pixel samples are scaled and mapped to a same reference frame according to reference frame indexes. Further, a motion vector of each pixel in the current picture block may be calculated according to optimal motion vectors of the K pixel samples by using an affine transformation formula. The foregoing solution is helpful in resolving a problem that inter-frame prediction accuracy is low in a current video coding standard when a video includes content of a non-translational feature, for example, lens zooming, object deformation, or moving object rotation. In addition, a disadvantage that an affine transformation technology proposed in the conventional technology is hardly applied to multi-direction prediction and multiple-reference-frames-based prediction is overcome, and this is helpful in making full use of a temporary correlation between video sequences to remove temporary redundancy, thereby improving coding efficiency.

Figure 7:
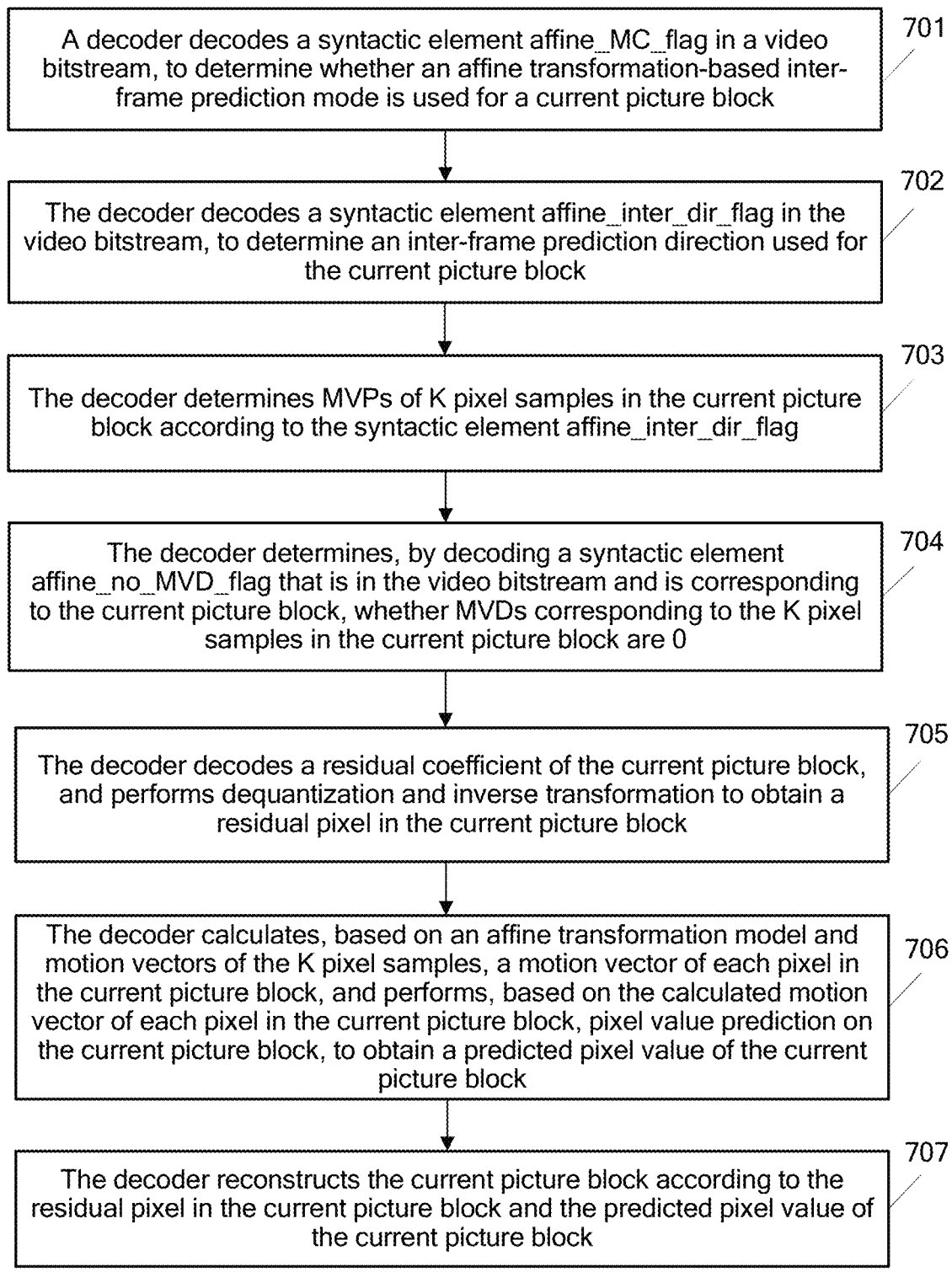
FIG. 7 is a schematic flowchart of a video decoding method according to an embodiment of the present application.

Referring to FIG. 7, FIG. 7 is a schematic flowchart of a video decoding method according to an embodiment of the present application. As shown in an example of FIG. 7, the video decoding method provided in this embodiment of the present application may include the following steps.

701. A decoder decodes a syntactic element affine_MC_flag in a video bitstream, to determine whether an affine transformation-based inter-frame prediction mode is used for a current picture block.

702. If the affine transformation-based inter-frame prediction mode is used for the current picture block, the decoder decodes a syntactic element affine_inter_dir_flag in the video bitstream, to determine an inter-frame prediction direction used for the current picture block.

703. The decoder determines MVPs of K pixel samples in the current picture block according to the syntactic element affine_inter_dir_flag.

The K pixel samples in the current picture block may be K pixel samples in a current picture block that are described in any one of the foregoing embodiments.

704. The decoder determines, by decoding a syntactic element affine_no_MVD_flag that is in the video bitstream and is corresponding to the current picture block, whether MVDs corresponding to the K pixel samples in the current picture block are 0. If affine_no_MVD_flag is true, it indicates that the MVDs corresponding to the K pixel samples in the current picture block are all 0, and motion vectors corresponding to the obtained MVPs of the K pixel samples may be used as motion vectors of the K pixel samples. If affine_no_MVD_flag is false, it indicates that the MVDs corresponding to the K pixel samples are not all 0, the MVDs corresponding to the K pixel samples are obtained by means of separate decoding, and an MVD corresponding to each pixel sample and a corresponding MVP are added to obtain a motion vector of the pixel sample.

705. The decoder decodes a residual coefficient of the current picture block, and performs dequantization and inverse transformation to obtain a residual pixel in the current picture block.

706. The decoder calculates, based on an affine transformation model and motion vectors of the K pixel samples, a motion vector of each pixel in the current picture block, and performs, based on the calculated motion vector of each pixel in the current picture block, pixel value prediction on the current picture block, to obtain a predicted pixel value of the current picture block.

It should be noted that in this embodiment, the affine transformation model is mainly used as an example of a non-translational motion model for description, and a mechanism for calculating, based on another non-translational motion model and the motion vectors of the K pixel samples, the motion vector of each pixel in the current picture block has a similar principle although formulas different from those used in this embodiment may be used in the mechanism. Examples are not listed one by one herein.

707. The decoder reconstructs the current picture block according to the residual pixel in the current picture block and the predicted pixel value of the current picture block.

Further, because motion information of each pixel in the current picture block may be used for motion vector prediction for another picture block, one piece of motion information may be stored for each 4×4 (or 8×8) block, and a motion vector of each 4×4 (or 8×8) block is stored as motion information of a pixel on an upper left corner or any other pixel in the 4×4 (or 8×8) block.

The motion information may include a motion vector, a prediction direction corresponding to the motion vector, and a reference frame index corresponding to the motion vector.

It may be learned that in the technical solution in this embodiment, determined motion vector predictors of K pixel samples are referenced during pixel value prediction performed, based on a non-translational motion model, on a current picture block. The K pixel samples include a first vertex angle pixel sample in the current picture block. The motion vector predictors of the K pixel samples are directly used for prediction, a motion vector predictor of the first vertex angle pixel sample in the K pixel samples is obtained based on a motion vector of a preset first spatially adjacent picture block of the current picture block, and there is a single optional case for the motion vector predictors of the K pixel samples. Therefore, a mechanism that is used in a conventional technology and in which motion vector predictors of K pixel samples are selected from multiple optional motion vector predictor sets of the K pixel samples by means of massive calculation is abandoned. This is helpful in avoiding transferring selection information of motion information predictors in a bitstream, is helpful in improving coding efficiency, and is also helpful in significantly reducing calculation complexity of picture prediction based on a non-translational motion model.

Further, prediction directions of the MVPs of the K pixel samples in the current picture block are normalized, reference frame indexes are processed, and motion vectors corresponding to the MVPs of the K pixel samples are scaled and mapped to a same reference frame according to reference frame indexes. Further, a motion vector of each pixel in the current picture block may be calculated according to optimal motion vectors of the K pixel samples by using an affine transformation formula. The foregoing solution is helpful in resolving a problem that inter-frame prediction accuracy is low in a current video coding standard when a video includes content of a non-translational feature, for example, lens zooming, object deformation, or moving object rotation. In addition, a disadvantage that an affine transformation technology proposed in the conventional technology is hardly applied to multi-direction prediction and multiple-reference-frames-based prediction is overcome, and this is helpful in making full use of a temporary correlation between video sequences to remove temporary redundancy, thereby improving coding efficiency.

An emulation test is performed on some solutions, provided in the embodiments of the present application, on an encoder HM11.0 of the latest video coding standard HEVC. For example, a test is performed in two configurations: a low delay (LDB) and random access (RA), and performance of the solutions in the embodiments of the present application is compared with performance of the HM11.0 solution. Six test sequences whose affine features are relatively apparent are selected for testing. The test sequences are listed in Table 1, and emulation results are shown in Table 2.

TABLE 1

| Sequence name | Resolution | Frame rate | Sequence length |
|---|---|---|---|
| Intotree | 1920 × 1080 | 50 | 3 seconds |
| Cactus | 1920 × 1080 | 50 | 3 seconds |
| Tractor | 1920 × 1080 | 25 | 3 seconds |
| City | 1280 × 720 | 60 | 5 seconds |
| Crew | 1280 × 720 | 60 | 5 seconds |

TABLE 1-continued

| Sequence name | Resolution | Frame rate | Sequence length |
|---|---|---|---|
| SlideShow | 1280 × 720 | 20 | 5 seconds |

TABLE 2

| Sequence name | LDB BD Rate | | | RA | | |
|---|---|---|---|---|---|---|
| | Y | U | V | Y | U | V |
| Intotree | −1.1% | 0.1% | −0.1% | −1.6% | −1.1% | −1.7% |
| Cactus | −3.8% | −2.6% | −2.3% | −4.7% | −3.7% | −3.3% |
| Tractor | −13.2% | −11.3% | −10.6% | −17.8% | −14.6% | −14.5% |
| City | −1.1% | −0.6% | −0.1% | −1.5% | −1.4% | −1.7% |
| Crew | −0.6% | −0.2% | −0.6% | −0.7% | −0.8% | −1.0% |
| SlideShow | −7.4% | −8.7% | −8.6% | −4.0% | −4.2% | −4.2% |
| Average value | −4.5% | −3.9% | −3.7% | −5.0% | −4.3% | −4.4% |

A performance counter Bjøntegaard delta rate (BD-rate) may be obtained by means of calculation by using results of four points whose quantization parameters (QPs) are 22, 27, 32, and 37, and peak signal to noise ratios (PSNR) of three components Y, U, and V are respectively calculated.

It may be learned that for the solutions in the embodiments of the present application, in the LDB configuration, an average BD-rate (Y) performance increases by 4.5%, and in the random access configuration, an average BD-rate (Y) performance increases by 5.0%, and even by 17.8%. That is, when PSNR quality is the same, compared with the HM11.0 solution, the solutions in the embodiments can reduce a bit rate of a maximum of 17.8%.

The following describes some other non-translational motion models.

An affine transformation model is a motion model that meets the following model:

$$\begin{cases} x' = ax + by + e \\ y' = cx + dy + f \\ v_x = x - x' \\ v_y = y - y' \end{cases}$$

where a, b, c, d, e, and f are constant parameters, (x, y) are original coordinates of a pixel, (x', y') are coordinates obtained after affine transformation is performed on the pixel, Vx is a motion vector in an x-axis direction, and Vy is a motion vector in a y-axis direction.

A rotary motion model may be shown as follows:

$$\begin{bmatrix} x' \\ y' \end{bmatrix} = \begin{bmatrix} \cos\alpha & \sin\alpha & a \\ -\sin\alpha & \cos\alpha & b \end{bmatrix} \begin{bmatrix} x \\ y \\ 1 \end{bmatrix}.$$

where α is a rotation angle, and a and b are parameters.
A perspective motion model may be shown as follows:

$$\begin{bmatrix} x' \\ y' \\ n' \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix}.$$

where $$\begin{bmatrix} h_{11} & h_{12} & h_{13} \\ h_{21} & h_{22} & h_{23} \\ h_{31} & h_{32} & 1 \end{bmatrix}$$

is a perspective matrix.
A shearing motion model may be shown as follows:

$$\begin{bmatrix} x' \\ y' \\ n' \end{bmatrix} = \begin{bmatrix} 1 & b & 0 \\ d & 1 & 0 \\ 0 & 0 & 1 \end{bmatrix} \cdot \begin{bmatrix} x \\ y \\ 1 \end{bmatrix} = \begin{bmatrix} x + by \\ dx + y \\ 1 \end{bmatrix}$$

where $$\begin{bmatrix} 1 & b & 0 \\ d & 1 & 0 \\ 0 & 0 & 1 \end{bmatrix}$$

is a shear matrix, and others are constant parameters.
A scalable motion model may be shown as follows:

$$\begin{cases} V_x = \rho_X X + \theta_X \\ V_y = \rho_X y + \theta_y \end{cases},$$

where $\rho_x$, $\rho_y$, $\theta_x$, and $\theta_y$ are constant parameters.
A quadratic motion model may be shown as follows:

$$\begin{cases} x(u, v) = Au^2 + Bu + Cuv + Dv^2 + Ev + F \\ y(u, v) = Gu^2 + Hu + Kuv + Lv^2 + Mv + N \end{cases},$$

where u and v represent original coordinates, x and y represent coordinates obtained after transformation, and others are constant parameters.

It may be understood that the foregoing examples are only examples of some possible representation forms of various motion models, and certainly, the various motion models may have other forms.

The following further provides related apparatuses for implementing the foregoing solutions.

Figure 8:
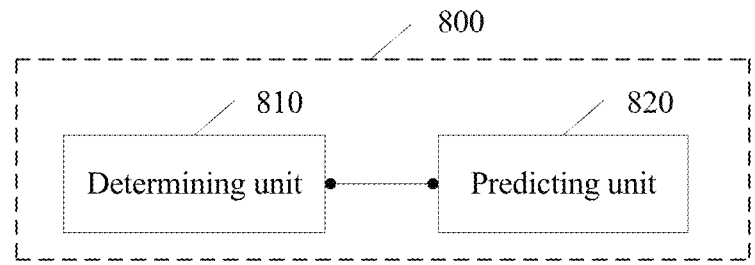
FIG. 8 is a schematic diagram of a picture prediction apparatus according to an embodiment of the present application.

Referring to FIG. 8, an embodiment of the present application provides a picture prediction apparatus 800, and the picture prediction apparatus 800 may include:

a determining unit 810, configured to determine motion vector predictors of K pixel samples in a current picture block, where K is an integer greater than 1, the K pixel samples include a first vertex angle pixel sample in the current picture block, a motion vector predictor of the first vertex angle pixel sample is obtained based on a motion vector of a preset first spatially adjacent picture block of the current picture block, and the first spatially adjacent picture block is spatially adjacent to the first vertex angle pixel sample; and a predicting unit 820, configured to perform, based on a non-translational motion model and the motion vector predictors of the K pixel samples, pixel value prediction on the current picture block.

Optionally, in some possible implementation manners of the present application, the motion vector predictor of the first vertex angle pixel sample is obtained based on the motion vector of the preset first spatially adjacent picture block of the current picture block. Specifically, the motion vector predictor of the first vertex angle pixel sample may be equal to the motion vector of the preset first spatially adjacent picture block of the current picture block (that is, the motion vector of the preset first spatially adjacent picture block of the current picture block is used as the motion vector predictor of the first vertex angle pixel sample); or a motion vector predictor obtained by performing preset transformation on the motion vector of the preset first spatially adjacent picture block of the current picture block may be used as the motion vector predictor of the first vertex angle pixel sample.

Optionally, in some possible implementation manners of the present application, the non-translational motion model is any one of the following models: an affine transformation model, a parabolic motion model, a rotary motion model, a perspective motion model, a shearing motion model, or a scalable motion model. It may be understood that the non-translational motion model is not limited to the foregoing specific examples.

There may be various manners of selecting the K pixel samples.

Optionally, in some possible implementation manners of the present application, the K pixel samples include at least two pixel samples in an upper left pixel sample, an upper right pixel sample, a lower left pixel sample, or a lower right pixel sample in the current picture block.

If the pixel sample is a pixel block, a size of the pixel block is, for example, 2×2, 1×2, 4×2, 4×4, or another size.

Optionally, in some possible implementation manners of the present application, the upper left pixel sample in the current picture block is an upper left vertex of the current picture block or a pixel block that is in the current picture block and that includes an upper left vertex of the current picture block. The lower left pixel sample in the current picture block is a lower left vertex of the current picture block or a pixel block that is in the current picture block and that includes a lower left vertex of the current picture block. The upper right pixel sample in the current picture block is an upper right vertex of the current picture block or a pixel block that is in the current picture block and that includes an upper right vertex of the current picture block. The lower right pixel sample in the current picture block is a lower right vertex of the current picture block or a pixel block that is in the current picture block and that includes a lower right vertex of the current picture block.

Optionally, in some possible implementation manners of the present application, the K pixel samples may further include a center pixel sample in the current picture block. The center pixel sample in the current picture block may be a center pixel in the current picture block or a pixel block that is in the current picture block and that includes a center pixel in the current picture block.

Optionally, in some possible implementation manners of the present application, the first spatially adjacent picture block may be a picture block X1, a picture block X2, a picture block X3, or a picture block X4.

A motion vector predictor of the upper left pixel sample in the current picture block may be obtained based on a motion vector of the picture block X1, the picture block X1 is a spatially adjacent picture block of the current picture block, and the picture block X1 is spatially adjacent to the upper left pixel sample in the current picture block.

A motion vector predictor of the upper right pixel sample in the current picture block may be obtained based on a motion vector of the picture block X2, the picture block X2 is a spatially adjacent picture block of the current picture block, and the picture block X2 is spatially adjacent to the upper right pixel sample in the current picture block.

A motion vector predictor of the lower left pixel sample in the current picture block may be obtained based on a motion vector of the picture block X3, the picture block X3 is a spatially adjacent picture block of the current picture block, and the picture block X3 is spatially adjacent to the lower left pixel sample in the current picture block.

A motion vector predictor of the lower right pixel sample in the current picture block may be obtained based on a motion vector of the picture block X4, the picture block X4 is a spatially adjacent picture block of the current picture block, and the picture block X4 is spatially adjacent to the lower right pixel sample in the current picture block.

Optionally, in some possible implementation manners of the present application, the first vertex angle pixel sample may be the upper left pixel sample in the current picture block, and the first spatially adjacent picture block may be the picture block X1. The picture block X1 is a spatially adjacent picture block on the upper left of the current picture block, or the picture block X1 is a spatially adjacent picture block on the left of the current picture block, or the picture block X1 is a spatially adjacent picture block above the current picture block.

Optionally, in some possible implementation manners of the present application, the picture block X2 is a spatially adjacent picture block above the current picture block, or the picture block X2 is a spatially adjacent picture block on the upper right of the current picture block, or the picture block X2 is a spatially adjacent picture block on the right of the current picture block. Still optionally, an absolute value of a difference between a motion vector absolute value of the picture block X2 and a motion vector absolute value of the picture block X1 is greater than or equal to an absolute value of a difference between a motion vector absolute value of a picture block X5 and the motion vector absolute value of the picture block X1, and the picture block X5 is any one of remaining at least some spatially adjacent picture blocks, other than the picture block X2, that are of the current picture block and that are spatially adjacent to the upper right vertex. That is, a location of the picture block X2 may be determined based on a specific policy, or a location of the picture block X2 may be directly agreed.

Optionally, in some possible implementation manners of the present application, the picture block X3 is a spatially adjacent picture block on the left of the current picture block, or the picture block X3 is a spatially adjacent picture block on the lower left of the current picture block, or the picture block X3 is a spatially adjacent picture block below the current picture block. Still optionally, an absolute value of a difference between a motion vector absolute value of the picture block X3 and the motion vector absolute value of the picture block X1 is greater than or equal to an absolute value of a difference between a motion vector absolute value of a picture block X6 and the motion vector absolute value of the picture block X1, and the picture block X6 is any one of remaining at least some spatially adjacent picture blocks, other than the picture block X3, that are of the current picture block and that are spatially adjacent to the lower left vertex. That is, a location of the picture block X3 may be determined based on a specific policy, or a location of the picture block X3 may be directly agreed.

Optionally, in some possible implementation manners of the present application, the picture block X4 is a spatially adjacent picture block on the right of the current picture block, or the picture block X4 is a spatially adjacent picture block on the lower right of the current picture block, or the picture block X4 is a spatially adjacent picture block below the current picture block. Still optionally, an absolute value of a difference between a motion vector absolute value of the picture block X4 and the motion vector absolute value of the picture block X1 is greater than or equal to an absolute value of a difference between a motion vector absolute value of a picture block X7 and the motion vector absolute value of the picture block X1, and the picture block X7 is any one of remaining at least some spatially adjacent picture blocks, other than the picture block X4, that are of the current picture block and that are spatially adjacent to the lower left vertex.

Referring to FIG. 2, FIG. 2 shows examples of some possible locations of the picture block X1, the picture block X2, the picture block X3, and the picture block X4.

Optionally, in some possible implementation manners of the present application, the predicting unit 820 may be configured to: if reference frames corresponding to the motion vector predictors of the K pixel samples are a reference frame Y1, perform motion estimation on the K pixel samples by using the motion vector predictors of the K pixel samples, to obtain motion vectors of the K pixel samples; and perform pixel value prediction on the current picture block by using the non-translational motion model and the motion vectors of the K pixel samples.

Optionally, the predicting unit 820 may be specifically configured to: when reference frames corresponding to motion vector predictors of K1 pixel samples in the K pixel samples are not a reference frame Y1, scale the motion vector predictors of the K1 pixel samples to the reference frame Y1, perform motion estimation on the K pixel samples by using motion vector predictors of K2 pixel samples and motion vector predictors that are of the K1 pixel samples and that are scaled to the reference frame Y1, to obtain motion vectors of the K pixel samples, and perform pixel value prediction on the current picture block by using the non-translational motion model and the motion vectors of the K pixel samples, where the K2 pixel samples are remaining pixel samples other than the K1 pixel samples in the K pixel samples, and K1 and K2 are positive integers.

Optionally, in some possible implementation manners of the present application, the reference frame Y1 may be a reference frame corresponding to the motion vector predictor of the first vertex angle pixel sample, or the reference frame Y1 may be a reference frame corresponding to a motion vector predictor of another pixel sample in the K pixel samples.

Optionally, in some possible implementation manners of the present application, a pixel sample i is any pixel sample except the first vertex angle pixel sample in the K pixel samples, and if a prediction direction corresponding to a motion vector predictor of the pixel sample i is different from a prediction direction corresponding to the motion vector predictor of the first vertex angle pixel sample, a reference frame index corresponding to the motion vector predictor of the pixel sample i is 0.

Optionally, in some possible implementation manners of the present application, if reference frame indexes corresponding to the motion vector predictors of the first vertex angle pixel sample and the pixel sample i are different, the predicting unit 820 may scale the motion vector predictor of the pixel sample i to the reference frame Y1.

Optionally, in some possible implementation manners of the present application, the predicting unit 820 may be specifically configured to perform motion estimation on the K pixel samples based on an iterative search algorithm (or a motion estimation algorithm of another type) by using the motion vector predictors of the K2 pixel samples and the motion vector predictors that are of the K1 pixel samples and that are scaled to the reference frame Y1, to obtain the motion vectors of the K pixel samples.

Optionally, in some possible implementation manners of the present application, the performing motion estimation on the K pixel samples by using motion vector predictors of K2 pixel samples and motion vector predictors that are of the K1 pixel samples and that are scaled to the reference frame Y1, to obtain motion vectors of the K pixel samples includes: performing motion estimation on the K pixel samples based on an iterative search algorithm by using the motion vector predictors of the K2 pixel samples and the motion vector predictors that are of the K1 pixel samples and that are scaled to the reference frame Y1, to obtain the motion vectors of the K pixel samples.

The picture prediction apparatus 800 is applied to a video coding apparatus or the picture prediction apparatus 800 is applied to a video decoding apparatus.

It may be understood that functions of all functional modules in the picture prediction apparatus 800 in this embodiment may be specifically implemented according to the methods in the foregoing method embodiments. For a specific implementation process, refer to related descriptions in the foregoing method embodiments, and details are not described herein again. The picture prediction apparatus 800 may be any apparatus that needs to output and play a video, for example, a laptop computer, a tablet computer, a personal computer, or a mobile phone.

It may be learned that in the technical solution in this embodiment, determined motion vector predictors of K pixel samples are referenced during pixel value prediction performed, based on a non-translational motion model, on a current picture block. The K pixel samples include a first vertex angle pixel sample in the current picture block. The motion vector predictors of the K pixel samples are directly used for prediction, a motion vector predictor of the first vertex angle pixel sample in the K pixel samples is obtained based on a motion vector of a preset first spatially adjacent picture block of the current picture block, and there is a single optional case for the motion vector predictors of the K pixel samples. Therefore, a mechanism that is used in a conventional technology and in which motion vector predictors of K pixel samples are selected from multiple optional motion vector predictor sets of the K pixel samples by means of massive calculation is abandoned. This is helpful in avoiding transferring selection information of motion information predictors in a bitstream, is helpful in improving coding efficiency, and is also helpful in significantly reducing calculation complexity of picture prediction based on a non-translational motion model.

Further, the first spatially adjacent picture block is spatially adjacent to the first vertex angle pixel sample, and the first spatially adjacent picture block of the current picture block is preset (that is, it may be considered that the first spatially adjacent picture block of the current picture block is agreed or set in advance). In this way, this is helpful in quickly determining the motion vector predictors of the K pixel samples. In addition, because redundancy is removed by making full use of a spatial correlation between picture blocks, this is helpful in further improving coding efficiency.

Figure 9:
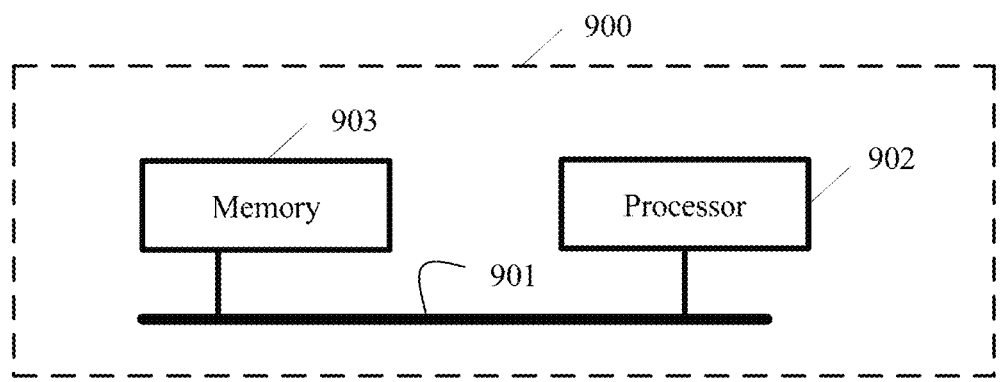
FIG. 9 is a schematic diagram of another picture prediction apparatus according to an embodiment of the present application.

Referring to FIG. 9, FIG. 9 is a schematic diagram of a picture prediction apparatus 900 according to an embodiment of the present application. The picture prediction apparatus 900 may include at least one bus 901, at least one processor 902 connected to the bus 901, and at least one memory 903 connected to the bus 901.

The processor 902 invokes, by using the bus 901, code stored in the memory 903, so as to determine motion vector predictors of K pixel samples in a current picture block, where K is an integer greater than 1, the K pixel samples include a first vertex angle pixel sample in the current picture block, a motion vector predictor of the first vertex angle pixel sample is obtained based on a motion vector of a preset first spatially adjacent picture block of the current picture block, and the first spatially adjacent picture block is spatially adjacent to the first vertex angle pixel sample; and perform, based on a non-translational motion model and the motion vector predictors of the K pixel samples, pixel value prediction on the current picture block.

Optionally, in some possible implementation manners of the present application, the motion vector predictor of the first vertex angle pixel sample is obtained based on the motion vector of the preset first spatially adjacent picture block of the current picture block. Specifically, the motion vector predictor of the first vertex angle pixel sample may be equal to the motion vector of the preset first spatially adjacent picture block of the current picture block (that is, the motion vector of the preset first spatially adjacent picture block of the current picture block is used as the motion vector predictor of the first vertex angle pixel sample); or a motion vector predictor obtained by performing preset transformation on the motion vector of the preset first spatially adjacent picture block of the current picture block may be used as the motion vector predictor of the first vertex angle pixel sample.

Optionally, in some possible implementation manners of the present application, the non-translational motion model is any one of the following models: an affine transformation model, a parabolic motion model, a rotary motion model, a perspective motion model, a shearing motion model, or a scalable motion model. It may be understood that the non-translational motion model is not limited to the foregoing specific examples.

There may be various manners of selecting the K pixel samples.

Optionally, in some possible implementation manners of the present application, the K pixel samples include at least two pixel samples in an upper left pixel sample, an upper right pixel sample, a lower left pixel sample, or a lower right pixel sample in the current picture block.

If the pixel sample is a pixel block, a size of the pixel block is, for example, 2×2, 1×2, 4×2, 4×4, or another size.

Optionally, in some possible implementation manners of the present application, the upper left pixel sample in the current picture block is an upper left vertex of the current picture block or a pixel block that is in the current picture block and that includes an upper left vertex of the current picture block. The lower left pixel sample in the current picture block is a lower left vertex of the current picture block or a pixel block that is in the current picture block and that includes a lower left vertex of the current picture block. The upper right pixel sample in the current picture block is an upper right vertex of the current picture block or a pixel block that is in the current picture block and that includes an upper right vertex of the current picture block. The lower right pixel sample in the current picture block is a lower right vertex of the current picture block or a pixel block that is in the current picture block and that includes a lower right vertex of the current picture block.

Optionally, in some possible implementation manners of the present application, the K pixel samples may further include a center pixel sample in the current picture block. The center pixel sample in the current picture block may be a center pixel in the current picture block or a pixel block that is in the current picture block and that includes a center pixel in the current picture block.

Optionally, in some possible implementation manners of the present application, the first spatially adjacent picture block may be a picture block X1, a picture block X2, a picture block X3, or a picture block X4.

A motion vector predictor of the upper left pixel sample in the current picture block may be obtained based on a motion vector of the picture block X1, the picture block X1 is a spatially adjacent picture block of the current picture block, and the picture block X1 is spatially adjacent to the upper left pixel sample in the current picture block.

A motion vector predictor of the upper right pixel sample in the current picture block may be obtained based on a motion vector of the picture block X2, the picture block X2 is a spatially adjacent picture block of the current picture block, and the picture block X2 is spatially adjacent to the upper right pixel sample in the current picture block.

A motion vector predictor of the lower left pixel sample in the current picture block may be obtained based on a motion vector of the picture block X3, the picture block X3 is a spatially adjacent picture block of the current picture block, and the picture block X3 is spatially adjacent to the lower left pixel sample in the current picture block.

A motion vector predictor of the lower right pixel sample in the current picture block may be obtained based on a motion vector of the picture block X4, the picture block X4 is a spatially adjacent picture block of the current picture block, and the picture block X4 is spatially adjacent to the lower right pixel sample in the current picture block.

Optionally, in some possible implementation manners of the present application, the first vertex angle pixel sample may be the upper left pixel sample in the current picture block, and the first spatially adjacent picture block may be the picture block X1. The picture block X1 is a spatially adjacent picture block on the upper left of the current picture block, or the picture block X1 is a spatially adjacent picture block on the left of the current picture block, or the picture block X1 is a spatially adjacent picture block above the current picture block.

Optionally, in some possible implementation manners of the present application, the picture block X2 is a spatially adjacent picture block above the current picture block, or the picture block X2 is a spatially adjacent picture block on the upper right of the current picture block, or the picture block X2 is a spatially adjacent picture block on the right of the current picture block. Still optionally, an absolute value of a difference between a motion vector absolute value of the picture block X2 and a motion vector absolute value of the picture block X1 is greater than or equal to an absolute value of a difference between a motion vector absolute value of a picture block X5 and the motion vector absolute value of the picture block X1, and the picture block X5 is any one of remaining at least some spatially adjacent picture blocks, other than the picture block X2, that are of the current picture block and that are spatially adjacent to the upper right vertex. That is, a location of the picture block X2 may be determined based on a specific policy, or a location of the picture block X2 may be directly agreed.

Optionally, in some possible implementation manners of the present application, the picture block X3 is a spatially adjacent picture block on the left of the current picture block, or the picture block X3 is a spatially adjacent picture block on the lower left of the current picture block, or the picture block X3 is a spatially adjacent picture block below the current picture block. Still optionally, an absolute value of a difference between a motion vector absolute value of the picture block X3 and the motion vector absolute value of the picture block X1 is greater than or equal to an absolute value of a difference between a motion vector absolute value of a picture block X6 and the motion vector absolute value of the picture block X1, and the picture block X6 is any one of remaining at least some spatially adjacent picture blocks, other than the picture block X3, that are of the current picture block and that are spatially adjacent to the lower left vertex. That is, a location of the picture block X3 may be determined based on a specific policy, or a location of the picture block X3 may be directly agreed.

Optionally, in some possible implementation manners of the present application, the picture block X4 is a spatially adjacent picture block on the right of the current picture block, or the picture block X4 is a spatially adjacent picture block on the lower right of the current picture block, or the picture block X4 is a spatially adjacent picture block below the current picture block. Still optionally, an absolute value of a difference between a motion vector absolute value of the picture block X4 and the motion vector absolute value of the picture block X1 is greater than or equal to an absolute value of a difference between a motion vector absolute value of a picture block X7 and the motion vector absolute value of the picture block X1, and the picture block X7 is any one of remaining at least some spatially adjacent picture blocks, other than the picture block X4, that are of the current picture block and that are spatially adjacent to the lower left vertex.

Optionally, in some possible implementation manners of the present application, the processor 902 may be configured to: if reference frames corresponding to the motion vector predictors of the K pixel samples are a reference frame Y1, perform motion estimation on the K pixel samples by using the motion vector predictors of the K pixel samples, to obtain motion vectors of the K pixel samples; and perform pixel value prediction on the current picture block by using the non-translational motion model and the motion vectors of the K pixel samples.

Optionally, in some possible implementation manners of the present application, the processor 902 may be configured to: when reference frames corresponding to motion vector predictors of K1 pixel samples in the K pixel samples are not a reference frame Y1, scale the motion vector predictors of the K1 pixel samples to the reference frame Y1, perform motion estimation on the K pixel samples by using motion vector predictors of K2 pixel samples and motion vector predictors that are of the K1 pixel samples and that are scaled to the reference frame Y1, to obtain motion vectors of the K pixel samples, and perform pixel value prediction on the current picture block by using the non-translational motion model and the motion vectors of the K pixel samples, where the K2 pixel samples are remaining pixel samples other than the K1 pixel samples in the K pixel samples, and K1 and K2 are positive integers.

Optionally, in some possible implementation manners of the present application, the reference frame Y1 may be a reference frame corresponding to the motion vector predictor of the first vertex angle pixel sample, or the reference frame Y1 may be a reference frame corresponding to a motion vector predictor of another pixel sample in the K pixel samples.

Optionally, in some possible implementation manners of the present application, a pixel sample i is any pixel sample except the first vertex angle pixel sample in the K pixel samples, and if a prediction direction corresponding to a motion vector predictor of the pixel sample i is different from a prediction direction corresponding to the motion vector predictor of the first vertex angle pixel sample, a reference frame index corresponding to the motion vector predictor of the pixel sample i is 0.

Optionally, in some possible implementation manners of the present application, if reference frame indexes corresponding to the motion vector predictors of the first vertex angle pixel sample and the pixel sample i are different, the processor 902 may be configured to scale the motion vector predictor of the pixel sample i to the reference frame Y1.

Optionally, in some possible implementation manners of the present application, the processor 902 may be configured to perform motion estimation on the K pixel samples based on an iterative search algorithm (or a motion estimation algorithm of another type) by using the motion vector predictors of the K2 pixel samples and the motion vector predictors that are of the K1 pixel samples and that are scaled to the reference frame Y1, to obtain the motion vectors of the K pixel samples.

It may be understood that functions of all functional modules in the picture prediction apparatus 900 in this embodiment may be specifically implemented according to the methods in the foregoing method embodiments. For a specific implementation process, refer to related descriptions in the foregoing method embodiments, and details are not described herein again. The picture prediction apparatus 900 may be any apparatus that needs to output and play a video, for example, a laptop computer, a tablet computer, a personal computer, or a mobile phone.

It may be learned that in the technical solution in this embodiment, determined motion vector predictors of K pixel samples are referenced during pixel value prediction performed, based on a non-translational motion model, on a current picture block. The K pixel samples include a first vertex angle pixel sample in the current picture block. The motion vector predictors of the K pixel samples are directly used for prediction, a motion vector predictor of the first vertex angle pixel sample in the K pixel samples is obtained based on a motion vector of a preset first spatially adjacent picture block of the current picture block, and there is a single optional case for the motion vector predictors of the K pixel samples. Therefore, a mechanism that is used in a conventional technology and in which motion vector predictors of K pixel samples are selected from multiple optional motion vector predictor sets of the K pixel samples by means of massive calculation is abandoned. This is helpful in avoiding transferring selection information of motion information predictors in a bitstream, is helpful in improving coding efficiency, and is also helpful in significantly reducing calculation complexity of picture prediction based on a non-translational motion model.

Further, the first spatially adjacent picture block is spatially adjacent to the first vertex angle pixel sample, and the first spatially adjacent picture block of the current picture block is preset (that is, it may be considered that the first spatially adjacent picture block of the current picture block is agreed or set in advance). In this way, this is helpful in quickly determining the motion vector predictors of the K pixel samples. In addition, because redundancy is removed by making full use of a spatial correlation between picture blocks, this is helpful in further improving coding efficiency.

Figure 10:
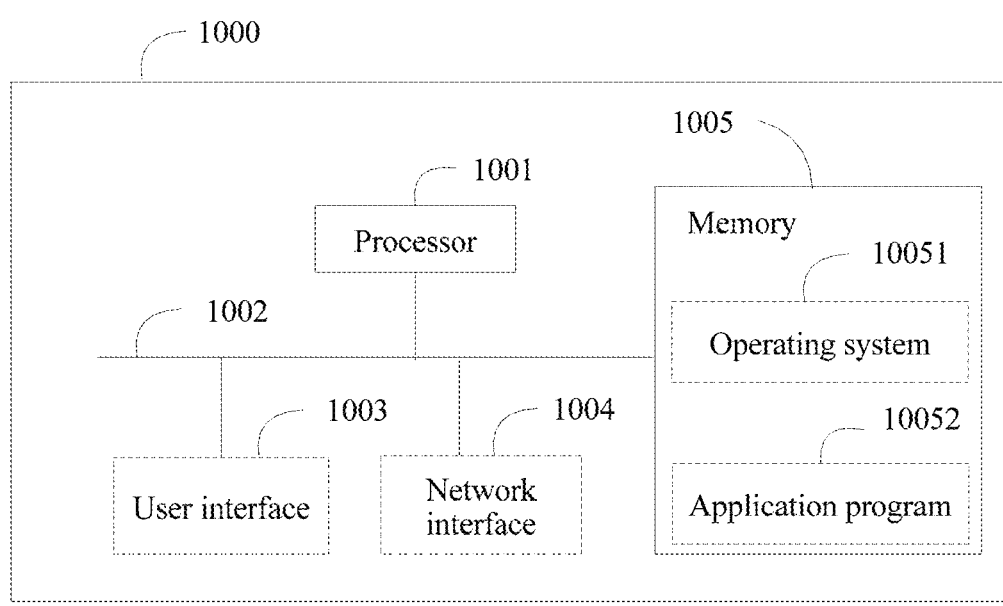
FIG. 10 is a schematic diagram of another picture prediction apparatus according to an embodiment of the present application.

Referring to FIG. 10, FIG. 10 is a structural block diagram of a picture prediction apparatus 1000 according to another embodiment of the present application. The picture prediction apparatus 1000 may include at least one processor 1001, at least one network interface 1004 or other user interface 1003, a memory 1005, and at least one communications bus 1002. The communications bus 1002 is configured to implement a connection and communication between these components. The picture prediction apparatus 1000 may optionally include the user interface 1003 that includes a display (for example, a touchscreen, a liquid crystal display (LCD), a holographic imaging device, a cathode ray tube (CRT), or a Projector), a click device (for example, a mouse, a trackball, a touchpad, or a touchscreen), a camera and/or a pickup apparatus, and the like.

The memory 1005 may include a read-only memory and a random access memory, and provide an instruction and data for the processor 1001. A part of the memory 1005 may further include a nonvolatile random access memory (NVRAM).

In some implementation manners, the memory 1005 stores the following element: an executable module or a data structure, or a subset thereof, or an extension set thereof:

an operating system 10051, including various system programs, and used to implement various basic services and process hardware-based tasks; and an application program module 10052, including various application programs, and used to implement various application services.

In this embodiment of the present application, by invoking a program or an instruction stored in the memory 1005, the processor 1001 is configured to: determine motion vector predictors of K pixel samples in a current picture block, where K is an integer greater than 1, the K pixel samples include a first vertex angle pixel sample in the current picture block, a motion vector predictor of the first vertex angle pixel sample is obtained based on a motion vector of a preset first spatially adjacent picture block of the current picture block, and the first spatially adjacent picture block is spatially adjacent to the first vertex angle pixel sample; and perform, based on a non-translational motion model and the motion vector predictors of the K pixel samples, pixel value prediction on the current picture block.

Optionally, in some possible implementation manners of the present application, the motion vector predictor of the first vertex angle pixel sample is obtained based on the motion vector of the preset first spatially adjacent picture block of the current picture block. Specifically, the motion vector predictor of the first vertex angle pixel sample may be equal to the motion vector of the preset first spatially adjacent picture block of the current picture block (that is, the motion vector of the preset first spatially adjacent picture block of the current picture block is used as the motion vector predictor of the first vertex angle pixel sample); or a motion vector predictor obtained by performing preset transformation on the motion vector of the preset first spatially adjacent picture block of the current picture block may be used as the motion vector predictor of the first vertex angle pixel sample.

Optionally, in some possible implementation manners of the present application, the non-translational motion model is any one of the following models: an affine transformation model, a parabolic motion model, a rotary motion model, a perspective motion model, a shearing motion model, or a scalable motion model. It may be understood that the non-translational motion model is not limited to the foregoing specific examples.

There may be various manners of selecting the K pixel samples.

Optionally, in some possible implementation manners of the present application, the K pixel samples include at least two pixel samples in an upper left pixel sample, an upper right pixel sample, a lower left pixel sample, or a lower right pixel sample in the current picture block.

If the pixel sample is a pixel block, a size of the pixel block is, for example, 2×2, 1×2, 4×2, 4×4, or another size.

Optionally, in some possible implementation manners of the present application, the upper left pixel sample in the current picture block is an upper left vertex of the current picture block or a pixel block that is in the current picture block and that includes an upper left vertex of the current picture block. The lower left pixel sample in the current picture block is a lower left vertex of the current picture block or a pixel block that is in the current picture block and that includes a lower left vertex of the current picture block. The upper right pixel sample in the current picture block is an upper right vertex of the current picture block or a pixel block that is in the current picture block and that includes an upper right vertex of the current picture block. The lower right pixel sample in the current picture block is a lower right vertex of the current picture block or a pixel block that is in the current picture block and that includes a lower right vertex of the current picture block.

Optionally, in some possible implementation manners of the present application, the K pixel samples may further include a center pixel sample in the current picture block. The center pixel sample in the current picture block may be a center pixel in the current picture block or a pixel block that is in the current picture block and that includes a center pixel in the current picture block.

Optionally, in some possible implementation manners of the present application, the first spatially adjacent picture block may be a picture block X1, a picture block X2, a picture block X3, or a picture block X4.

A motion vector predictor of the upper left pixel sample in the current picture block may be obtained based on a motion vector of the picture block X1, the picture block X1 is a spatially adjacent picture block of the current picture block, and the picture block X1 is spatially adjacent to the upper left pixel sample in the current picture block.

A motion vector predictor of the upper right pixel sample in the current picture block may be obtained based on a motion vector of the picture block X2, the picture block X2 is a spatially adjacent picture block of the current picture block, and the picture block X2 is spatially adjacent to the upper right pixel sample in the current picture block.

A motion vector predictor of the lower left pixel sample in the current picture block may be obtained based on a motion vector of the picture block X3, the picture block X3 is a spatially adjacent picture block of the current picture block, and the picture block X3 is spatially adjacent to the lower left pixel sample in the current picture block.

A motion vector predictor of the lower right pixel sample in the current picture block may be obtained based on a motion vector of the picture block X4, the picture block X4 is a spatially adjacent picture block of the current picture block, and the picture block X4 is spatially adjacent to the lower right pixel sample in the current picture block.

Optionally, in some possible implementation manners of the present application, the first vertex angle pixel sample may be the upper left pixel sample in the current picture block, and the first spatially adjacent picture block may be the picture block X1. The picture block X1 is a spatially adjacent picture block on the upper left of the current picture block, or the picture block X1 is a spatially adjacent picture block on the left of the current picture block, or the picture block X1 is a spatially adjacent picture block above the current picture block.

Optionally, in some possible implementation manners of the present application, the picture block X2 is a spatially adjacent picture block above the current picture block, or the picture block X2 is a spatially adjacent picture block on the upper right of the current picture block, or the picture block X2 is a spatially adjacent picture block on the right of the current picture block. Still optionally, an absolute value of a difference between a motion vector absolute value of the picture block X2 and a motion vector absolute value of the picture block X1 is greater than or equal to an absolute value of a difference between a motion vector absolute value of a picture block X5 and the motion vector absolute value of the picture block X1, and the picture block X5 is any one of remaining at least some spatially adjacent picture blocks, other than the picture block X2, that are of the current picture block and that are spatially adjacent to the upper right vertex. That is, a location of the picture block X2 may be determined based on a specific policy, or a location of the picture block X2 may be directly agreed.

Optionally, in some possible implementation manners of the present application, the picture block X3 is a spatially adjacent picture block on the left of the current picture block, or the picture block X3 is a spatially adjacent picture block on the lower left of the current picture block, or the picture block X3 is a spatially adjacent picture block below the current picture block. Still optionally, an absolute value of a difference between a motion vector absolute value of the picture block X3 and the motion vector absolute value of the picture block X1 is greater than or equal to an absolute value of a difference between a motion vector absolute value of a picture block X6 and the motion vector absolute value of the picture block X1, and the picture block X6 is any one of remaining at least some spatially adjacent picture blocks, other than the picture block X3, that are of the current picture block and that are spatially adjacent to the lower left vertex. That is, a location of the picture block X3 may be determined based on a specific policy, or a location of the picture block X3 may be directly agreed.

Optionally, in some possible implementation manners of the present application, the picture block X4 is a spatially adjacent picture block on the right of the current picture block, or the picture block X4 is a spatially adjacent picture block on the lower right of the current picture block, or the picture block X4 is a spatially adjacent picture block below the current picture block. Still optionally, an absolute value of a difference between a motion vector absolute value of the picture block X4 and the motion vector absolute value of the picture block X1 is greater than or equal to an absolute value of a difference between a motion vector absolute value of a picture block X7 and the motion vector absolute value of the picture block X1, and the picture block X7 is any one of remaining at least some spatially adjacent picture blocks, other than the picture block X4, that are of the current picture block and that are spatially adjacent to the lower left vertex.

Optionally, in some possible implementation manners of the present application, the processor 1001 may be configured to: if reference frames corresponding to the motion vector predictors of the K pixel samples are a reference frame Y1, perform motion estimation on the K pixel samples by using the motion vector predictors of the K pixel samples, to obtain motion vectors of the K pixel samples; and perform pixel value prediction on the current picture block by using the non-translational motion model and the motion vectors of the K pixel samples.

Optionally, in some possible implementation manners of the present application, the processor 1001 may be configured to: when reference frames corresponding to motion vector predictors of K1 pixel samples in the K pixel samples are not a reference frame Y1, scale the motion vector predictors of the K1 pixel samples to the reference frame Y1, perform motion estimation on the K pixel samples by using motion vector predictors of K2 pixel samples and motion vector predictors that are of the K1 pixel samples and that are scaled to the reference frame Y1, to obtain motion vectors of the K pixel samples, and perform pixel value prediction on the current picture block by using the non-translational motion model and the motion vectors of the K pixel samples, where the K2 pixel samples are remaining pixel samples other than the K1 pixel samples in the K pixel samples, and K1 and K2 are positive integers.

Optionally, in some possible implementation manners of the present application, the reference frame Y1 may be a reference frame corresponding to the motion vector predictor of the first vertex angle pixel sample, or the reference frame Y1 may be a reference frame corresponding to a motion vector predictor of another pixel sample in the K pixel samples.

Optionally, in some possible implementation manners of the present application, a pixel sample i is any pixel sample except the first vertex angle pixel sample in the K pixel samples, and if a prediction direction corresponding to a motion vector predictor of the pixel sample i is different from a prediction direction corresponding to the motion vector predictor of the first vertex angle pixel sample, a reference frame index corresponding to the motion vector predictor of the pixel sample i is 0.

Optionally, in some possible implementation manners of the present application, if reference frame indexes corresponding to the motion vector predictors of the first vertex angle pixel sample and the pixel sample i are different, the processor 1001 may be configured to scale the motion vector predictor of the pixel sample i to the reference frame Y1.

Optionally, in some possible implementation manners of the present application, the processor 1001 may be configured to perform motion estimation on the K pixel samples based on an iterative search algorithm (or a motion estimation algorithm of another type) by using the motion vector predictors of the K2 pixel samples and the motion vector predictors that are of the K1 pixel samples and that are scaled to the reference frame Y1, to obtain the motion vectors of the K pixel samples.

It may be understood that functions of all functional modules in the picture prediction apparatus 1000 in this embodiment may be specifically implemented according to the methods in the foregoing method embodiments. For a specific implementation process, refer to related descriptions in the foregoing method embodiments, and details are not described herein again. The picture prediction apparatus 1000 may be any apparatus that needs to output and play a video, for example, a laptop computer, a tablet computer, a personal computer, or a mobile phone.

It may be learned that in the technical solution in this embodiment, determined motion vector predictors of K pixel samples are referenced during pixel value prediction performed, based on a non-translational motion model, on a current picture block. The K pixel samples include a first vertex angle pixel sample in the current picture block. The motion vector predictors of the K pixel samples are directly used for prediction, a motion vector predictor of the first vertex angle pixel sample in the K pixel samples is obtained based on a motion vector of a preset first spatially adjacent picture block of the current picture block, and there is a single optional case for the motion vector predictors of the K pixel samples. Therefore, a mechanism that is used in a conventional technology and in which motion vector predictors of K pixel samples are selected from multiple optional motion vector predictor sets of the K pixel samples by means of massive calculation is abandoned. This is helpful in avoiding transferring selection information of motion information predictors in a bitstream, is helpful in improving coding efficiency, and is also helpful in significantly reducing calculation complexity of picture prediction based on a non-translational motion model.

Further, the first spatially adjacent picture block is spatially adjacent to the first vertex angle pixel sample, and the first spatially adjacent picture block of the current picture block is preset (that is, it may be considered that the first spatially adjacent picture block of the current picture block is agreed or set in advance). In this way, this is helpful in quickly determining the motion vector predictors of the K pixel samples. In addition, because redundancy is removed by making full use of a spatial correlation between picture blocks, this is helpful in further improving coding efficiency.

It should be noted that, for ease of description, the foregoing method embodiments are expressed as a series of actions. However, persons skilled in the art should appreciate that the present application is not limited to the described action sequence, because according to the present application, some steps may be performed in other sequences or performed simultaneously. In addition, persons skilled in the art should also appreciate that all the embodiments described in the specification are examples of embodiments, and the related actions and modules are not necessarily mandatory to the present application.

In the foregoing embodiments, all the embodiments have respective focuses of description. For a part that is not described in detail in an embodiment, refer to related descriptions in other embodiments.

In the embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions in the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions in the present application essentially, or the part contributing to the prior art, or all or some of the technical solutions may be implemented in the form of a software product. The software product is stored in a storage medium and includes instructions for instructing a computer device (which may be a personal computer, a server, or a network device) to perform all or some of the steps of the methods described in the embodiments of the present application. The foregoing storage medium includes: any medium that can store program code, such as a Universal Serial Bus (USB) flash drive, a read-only memory (ROM), a random access memory (RAM), a removable hard disk, a magnetic disk, or an optical disc.

The foregoing embodiments are merely intended for describing the technical solutions in the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in the embodiments of the present application. Additionally, statements made herein characterizing the invention refer to an embodiment of the invention and not necessarily all embodiments.

What is claimed is:

1. A picture prediction method for a video coding process, the method comprising:

determining, by an encoding apparatus, motion vector predictors (MVPs) of K pixel samples in a current picture block, wherein K is an integer greater than 1;

obtaining, by the encoding apparatus, respective motion vectors of the K pixel samples via motion estimation;

obtaining, by the encoding apparatus, motion vector differences (MVDs) of the K pixel samples based on the respective motion vectors of the K pixel samples and corresponding MVPs;

based on the MVDs of the K pixel samples not all being zero, writing, by the encoding apparatus, a flag and the MVDs of the K pixel samples into a bitstream, wherein the value of the flag is set to a first value; and obtaining, by the encoding apparatus, based on a non-translational motion model, a predicted pixel value of each pixel of the current picture block;

wherein obtaining the predicted pixel value of each pixel of the current picture block comprises:

calculating, based on the non-translational motion model, a motion vector of each pixel or each 4×4 block in the current picture block; and performing, based on the calculated motion vector of each pixel or each 4×4 block in the current picture block, pixel value prediction on the current picture block;

wherein the non-translational motion model is represented by $v_x = a \times x + b \times y + e$ and $v_y = c \times x + d \times y + f$, where (x,y) corresponds to the coordinates of a respective pixel or 4×4 block in the current picture block, and a, b, e, c, d and f are parameters of the non-translational motion model and are derived based on the respective motion vectors of the K pixel samples of the current picture block and a width and a height of the current picture block, wherein the respective motion vectors of the K pixel samples comprise motion vectors $(vx_0,vy_0)$, $(vx_1,vy_1)$, and $(vx_2,vy_2)$ of three vertices whose coordinates are $(0,0)$, $(S_1,0)$, and $(0,S_2)$, where $S_1$ is the width of the current picture block and $S_2$ is the height of the current picture block, and wherein $(v_x,v_y)$ represents a respective motion vector of a respective pixel or 4×4 block calculated based on the non-translational motion model;

wherein the flag indicates:

whether or not any MVD of a pixel sample of the K pixel samples is written into the bitstream; or whether or not all MVDs of the K pixel samples in the current picture block are 0.

2. The method according to claim 1, wherein:

the K pixel samples comprise at least two pixel samples in an upper left pixel sample, an upper right pixel sample, or a lower left pixel sample in the current picture block; and the upper left pixel sample in the current picture block is an upper left vertex of the current picture block or a pixel block that is in the current picture block and that comprises an upper left vertex of the current picture block, the lower left pixel sample in the current picture block is a lower left vertex of the current picture block or a pixel block that is in the current picture block and that comprises a lower left vertex of the current picture block, and the upper right pixel sample in the current picture block is an upper right vertex of the current picture block or a pixel block that is in the current picture block and that comprises an upper right vertex of the current picture block.

3. An encoding apparatus, comprising:

a non-transitory memory having processor-executable instructions stored thereon; and a processor, coupled to the non-transitory memory, configured to execute the processor-executable instructions to facilitate:

determining motion vector predictors (MVPs) of K pixel samples in a current picture block, wherein K is an integer greater than 1;

obtaining respective motion vectors of the K pixel samples via motion estimation;

obtaining motion vector differences (MVDs) of the K pixel samples based on the respective motion vectors of the K pixel samples and corresponding MVPs;

based on the MVDs of the K pixel samples not all being zero, writing a flag and the MVDs of the K pixel samples into a bitstream, wherein the value of the flag is set to a first value; and obtaining, based on a non-translational motion model, a predicted pixel value of each pixel of the current picture block;

wherein obtaining the predicted pixel value of each pixel of the current picture block comprises:

calculating, based on the non-translational motion model, a motion vector of each pixel or each 4×4 block in the current picture block; and performing, based on the calculated motion vector of each pixel or each 4×4 block in the current picture block, pixel value prediction on the current picture block;

wherein the non-translational motion model is represented by $v_x=axx+bxy+e$ and $v_y=cxx+dxy+f$, where $(x,y)$ corresponds to the coordinates of a respective pixel or 4×4 block in the current picture block, and a, b, e, c, d and f are parameters of the non-translational motion model and are derived based on the respective motion vectors of the K pixel samples of the current picture block and a width and a height of the current picture block, wherein the respective motion vectors of the K pixel samples comprise motion vectors $(vx_0,vy_0)$, $(vx_1,vy_1)$, and $(vx_2,vy_2)$ of three vertices whose coordinates are $(0,0)$, $(S_1,0)$, and $(0,S_2)$, where $S_1$ is the width of the current picture block and $S_2$ is the height of the current picture block, and wherein $(v_x,v_y)$ represents a respective motion vector of a respective pixel or 4×4 block calculated based on the non-translational motion model;

wherein the flag indicates:

whether or not any MVD of a pixel sample of the K pixel samples is written into the bitstream; or whether or not all MVDs of the K pixel samples in the current picture block are 0.

4. The apparatus according to claim 3, wherein:

the K pixel samples comprise at least two pixel samples in an upper left pixel sample, an upper right pixel sample, or a lower left pixel sample in the current picture block; and the upper left pixel sample in the current picture block is an upper left vertex of the current picture block or a pixel block that is in the current picture block and that comprises an upper left vertex of the current picture block, the lower left pixel sample in the current picture block is a lower left vertex of the current picture block or a pixel block that is in the current picture block and that comprises a lower left vertex of the current picture block, and the upper right pixel sample in the current picture block is an upper right vertex of the current picture block or a pixel block that is in the current picture block and that comprises an upper right vertex of the current picture block.

5. The method according to claim 1, wherein obtaining the MVDs of the K pixel samples comprises:

obtaining the MVDs of the K pixel samples by performing subtraction between the respective motion vectors of the K pixel samples and the corresponding MVPs.

6. A picture prediction method for a video decoding process, comprising:

determining, by a decoding apparatus, motion vector predictors (MVPs) of K pixel samples in a current picture block, wherein K is an integer greater than 1;

decoding, by the decoding apparatus, a flag of the current picture block from a bitstream;

based on the value of the flag having been set to a first value, decoding, by the decoding apparatus, motion vector differences (MVDs) of the K pixel samples from the bitstream and obtaining respective motion vectors of the K pixel samples based on the MVDs of the K pixel samples and corresponding MVPs of the K pixel samples; and obtaining, by the decoding apparatus, based on a non-translational motion model, a predicted pixel value of each pixel of the current picture block;

wherein obtaining the predicted pixel value of each pixel of the current picture block comprises:

calculating, based on the non-translational motion model, a motion vector of each pixel or each 4×4 block in the current picture block; and performing, based on the calculated motion vector of each pixel or each 4×4 block in the current picture block, pixel value prediction on the current picture block;

wherein the non-translational motion model is represented by $v_x=a\times x+b\times y+e$ and $v_y=c\times x+d\times y+f$, where (x,y) corresponds to the coordinates of a respective pixel or 4×4 block in the current picture block, and a, b, e, c, d and f are parameters of the non-translational motion model and are derived based on the respective motion vectors of the K pixel samples of the current picture block and a width and a height of the current picture block, wherein the respective motion vectors of the K pixel samples comprise motion vectors $(vx_0,vy_0)$, $(vx_1,vy_1)$, and $(vx_2,vy_2)$ of three vertices whose coordinates are (0,0), $(S_1,0)$, and $(0,S_2)$, where $S_1$ is the width of the current picture block and $S_2$ is the height of the current picture block, and wherein $(v_x,v_y)$ represents a respective motion vector of a respective pixel or 4×4 block calculated based on the non-translational motion model;

wherein the flag indicates:
whether or not any MVD of a pixel sample of the K pixel samples is written into the bitstream; or
whether or not all MVDs of the K pixel samples in the current picture block are 0.

7. The method according to claim 6, wherein:
the K pixel samples comprise at least two pixel samples in an upper left pixel sample, an upper right pixel sample, or a lower left pixel sample in the current picture block; and
the upper left pixel sample in the current picture block is an upper left vertex of the current picture block or a pixel block that is in the current picture block and that comprises an upper left vertex of the current picture block, the lower left pixel sample in the current picture block is a lower left vertex of the current picture block or a pixel block that is in the current picture block and that comprises a lower left vertex of the current picture block, and the upper right pixel sample in the current picture block is an upper right vertex of the current picture block or a pixel block that is in the current picture block and that comprises an upper right vertex of the current picture block.

8. The apparatus according to claim 3, wherein obtaining the MVDs of the K pixel samples comprises obtaining the MVDs of the K pixel samples by performing subtraction between the respective motion vectors of the K pixel samples and the corresponding MVPs.

9. A decoding apparatus, comprising:
a non-transitory memory having processor-executable instructions stored thereon; and
a processor, coupled to the non-transitory memory, configured to execute the processor-executable instructions to facilitate:
determining motion vector predictors (MVPs) of K pixel samples in a current picture block, wherein K is an integer greater than 1;
decoding a flag of the current picture block from a bitstream;
based on the value of the flag having been set to a first value, decoding motion vector differences (MVDs) of the K pixel samples from the bitstream and obtaining respective motion vectors of the K pixel samples based on the MVDs of the K pixel samples and corresponding MVPs of the K pixel samples; and
obtaining, based on a non-translational motion model, a predicted pixel value of each pixel of the current picture block;
wherein obtaining the predicted pixel value of each pixel of the current picture block comprises:

calculating, based on the non-translational motion model, a motion vector of each pixel or each 4×4 block in the current picture block; and
performing, based on the calculated motion vector of each pixel or each 4×4 block in the current picture block, pixel value prediction on the current picture block;

wherein the non-translational motion model is represented by $v_x=a\times x+b\times y+e$ and $v_y=c\times x+d\times y+f$, where (x,y) corresponds to the coordinates of a respective pixel or 4×4 block in the current picture block, and a, b, e, c, d and f are parameters of the non-translational motion model and are derived based on the respective motion vectors of the K pixel samples of the current picture block and a width and a height of the current picture block, wherein the respective motion vectors of the K pixel samples comprise motion vectors $(vx_0,vy_0)$, $(vx_1,vy_1)$, and $(vx_2,vy_2)$ of three vertices whose coordinates are (0,0), $(S_1,0)$, and $(0,S_2)$, where $S_1$ is the width of the current picture block and $S_2$ is the height of the current picture block, and wherein $(v_x,v_y)$ represents a respective motion vector of a respective pixel or 4×4 block calculated based on the non-translational motion model;

wherein the flag indicates:
whether or not any MVD of a pixel sample of the K pixel samples is written into the bitstream; or
whether or not all MVDs of the K pixel samples in the current picture block are 0.

10. The apparatus according to claim 9, wherein:
the K pixel samples comprise at least two pixel samples in an upper left pixel sample, an upper right pixel sample, or a lower left pixel sample in the current picture block; and
the upper left pixel sample in the current picture block is an upper left vertex of the current picture block or a pixel block that is in the current picture block and that comprises an upper left vertex of the current picture block, the lower left pixel sample in the current picture block is a lower left vertex of the current picture block or a pixel block that is in the current picture block and that comprises a lower left vertex of the current picture block, and the upper right pixel sample in the current picture block is an upper right vertex of the current picture block or a pixel block that is in the current picture block and that comprises an upper right vertex of the current picture block.

11. The apparatus according to claim 9, wherein the first value of the flag indicates that the MVDs of the K pixel samples are not all 0.

12. The apparatus according to claim 3, wherein a respective motion vector of a respective pixel whose coordinates are (x, y) is calculated as follows:

$$\begin{cases} vx = \dfrac{vx_1 - vx_0}{S_1}x + \dfrac{vx_2 - vx_0}{S_2}y + vx_0 \\ vy = \dfrac{vy_1 - vy_0}{S_1}x + \dfrac{vy_2 - vy_0}{S_2}y + vy_0 \end{cases}$$

wherein the size of the current picture block is $S_1 \times S_2$.

13. The apparatus according to claim 9, wherein a respective motion vector of a respective pixel whose coordinates are (x, y) is calculated as follows:

$$\begin{cases} vx = \dfrac{vx_1 - vx_0}{S_1}x + \dfrac{vx_2 - vx_0}{S_2}y + vx_0 \\ vy = \dfrac{vy_1 - vy_0}{S_1}x + \dfrac{vy_2 - vy_0}{S_2}y + vy_0 \end{cases}$$

wherein the size of the current picture block is $S_1 \times S_2$.

14. The apparatus according to claim 3, wherein the width and the height of the current picture block are associated with respective coordinates of the K pixel samples.

15. The apparatus according to claim 9, wherein the width and the height of the current picture block are associated with respective coordinates of the K pixel samples.

16. The method according to claim 1, wherein a respective motion vector of a respective pixel whose coordinates are (x, y) is calculated as follows:

$$\begin{cases} vx = \dfrac{vx_1 - vx_0}{S_1}x + \dfrac{vx_2 - vx_0}{S_2}y + vx_0 \\ vy = \dfrac{vy_1 - vy_0}{S_1}x + \dfrac{vy_2 - vy_0}{S_2}y + vy_0 \end{cases}$$

wherein the size of the current picture block is $S_1 \times S_2$.

17. The method according to claim 6, wherein a respective motion vector of a respective pixel whose coordinates are (x, y) is calculated as follows:

$$\begin{cases} vx = \dfrac{vx_1 - vx_0}{S_1}x + \dfrac{vx_2 - vx_0}{S_2}y + vx_0 \\ vy = \dfrac{vy_1 - vy_0}{S_1}x + \dfrac{vy_2 - vy_0}{S_2}y + vy_0 \end{cases}$$

wherein the size of the current picture block is $S_1 \times S_2$.

18. The method according to claim 1, further comprising:
determining, by the encoding apparatus, MVPs of K pixel samples in another picture block;
obtaining, by the encoding apparatus, respective motion vectors of the K pixel samples in the other picture block via motion estimation;
obtaining, by the encoding apparatus, MVDs of the K pixel samples in the other picture block based on the respective motion vectors and corresponding MVPs of the K pixel samples in the other picture block;
based on the MVDs of the K pixel samples in the other picture block all being zero, writing, by the encoding apparatus, a flag into a second bitstream, wherein the value of the flag in the second bitstream is set to a second value.

19. The method according to claim 6, further comprising:
determining, by the decoding apparatus, MVPs of K pixel samples in another picture block;
decoding, by the decoding apparatus, a flag of the other picture block from a second bitstream;
determining, by the decoding apparatus, based on the value of the flag of the other picture block having been set to a second value, the MVPs of the K pixel samples in the other picture block as respective motion vectors of the K pixel samples in the other picture block.

20. The apparatus according to claim 3, wherein the processor is further configured to execute the processor-executable instructions to facilitate:
determining MVPs of K pixel samples in another picture block;
obtaining respective motion vectors of the K pixel samples via in the other picture block via motion estimation;
obtaining MVDs of the K pixel samples in the other picture block based on the respective motion vectors and corresponding MVPs of the K pixel samples in the other picture block;
based on the MVDs of the K pixel samples in the other picture block all being zero, writing a flag into a second bitstream, wherein the value of the flag is set to a second value.

21. The apparatus according to claim 9, wherein the processor is further configured to execute the processor-executable instructions to facilitate:
determining MVPs of K pixel samples in another picture block;
decoding a flag of the other picture block from a second bitstream;
based on a value of the flag of the other picture block having been set to a second value, determining the MVPs of the K pixel samples in the other picture block as respective motion vectors of the K pixel samples in the other picture block.

22. The method according to claim 1, wherein the width and the height of the current picture block are associated with respective coordinates of the K pixel samples.

23. The method according to claim 6, wherein the width and the height of the current picture block are associated with respective coordinates of the K pixel samples.

24. A non-transitory computer-readable medium having processor-executable instructions stored thereon, wherein the processor-executable instructions, when executed, facilitate:
determining motion vector predictors (MVPs) of K pixel samples in a current picture block, wherein K is an integer greater than 1;
obtaining respective motion vectors of the K pixel samples via motion estimation;
obtaining motion vector differences (MVDs) of the K pixel samples based on the respective motion vectors of the K pixel samples and corresponding MVPs;
based on the MVDs of the K pixel samples not all being zero, writing a flag and the MVDs of the K pixel samples into a bitstream, wherein the value of the flag is set to a first value; and
obtaining, based on a non-translational motion model, a predicted pixel value of each pixel of the current picture block;
wherein obtaining the predicted pixel value of each pixel of the current picture block comprises:
calculating, based on the non-translational motion model, a motion vector of each pixel or each 4×4 block in the current picture block; and
performing, based on the calculated motion vector of each pixel or each 4×4 block in the current picture block, pixel value prediction on the current picture block;
wherein the non-translational motion model is represented by $v_x = a \times x + b \times y + e$ and $v_y = c \times x + d \times y + f$, where (x,y) corresponds to the coordinates of a respective pixel or 4×4 block in the current picture block, and a, b, e, c, d and f are parameters of the non-translational motion model and are derived based on the respective motion vectors of the K pixel samples of the current picture block and a width and a height of the current picture block, wherein the respective motion vectors of the K pixel samples comprise motion vectors $(vx_0, vy_0)$, ($vx_1,vy_1$), and ($vx_2,vy_2$) of three vertices whose coordinates are (0,0), ($S_1$,0), and (0, $S_2$), where $S_1$ is the width of the current picture block and $S_2$ is the height of the current picture block, and wherein ($v_x,v_y$) represents a respective motion vector of a respective pixel or 4×4 block calculated based on the non-translational motion model;

wherein the flag indicates:
whether or not any MVD of a pixel sample of the K pixel samples is written into the bitstream; or
whether or not all MVDs of the K pixel samples in the current picture block are 0.

25. A non-transitory computer-readable medium having processor-executable instructions stored thereon, wherein the processor-executable instructions, when executed, facilitate:

determining motion vector predictors (MVPs) of K pixel samples in a current picture block, wherein K is an integer greater than 1;

decoding a flag of the current picture block from a bitstream;

based on the value of the flag having been set to a first value, decoding motion vector differences (MVDs) of the K pixel samples from the bitstream and obtaining respective motion vectors of the K pixel samples based on the MVDs of the K pixel samples and corresponding MVPs of the K pixel samples; and obtaining, based on a non-translational motion model, a predicted pixel value of each pixel of the current picture block;

wherein obtaining the predicted pixel value of each pixel of the current picture block comprises:

calculating, based on the non-translational motion model, a motion vector of each pixel or each 4×4 block in the current picture block; and performing, based on the calculated motion vector of each pixel or each 4×4 block in the current picture block, pixel value prediction on the current picture block;

wherein the non-translational motion model is represented by $v_x=a\times x+b\times y+e$ and $v_y=c\times x+d\times y+f$, where (x,y) corresponds to the coordinates of a respective pixel or 4×4 block in the current picture block, and a, b, e, c, d and f are parameters of the non-translational motion model and are derived based on the respective motion vectors of the K pixel samples of the current picture block and a width and a height of the current picture block, wherein the respective motion vectors of the K pixel samples comprise motion vectors ($vx_0,vy_0$), ($vx_1,vy_1$), and ($vx_2,vy_2$) of three vertices whose coordinates are (0,0), ($S_1$,0), and (0,$S_2$), where $S_1$ is the width of the current picture block and $S_2$ is the height of the current picture block, and wherein ($v_x,v_y$) represents a respective motion vector of a respective pixel or 4×4 block calculated based on the non-translational motion model;

wherein the flag indicates:
whether or not any MVD of a pixel sample of the K pixel samples is written into the bitstream; or
whether or not all MVDs of the K pixel samples in the current picture block are 0.

* * * * *